United States Patent
Budkiewicz et al.

(10) Patent No.: US 11,763,267 B1
(45) Date of Patent: Sep. 19, 2023

(54) SYSTEM AND METHOD FOR JOINING A MEETING AND SETUP THEREOF

(71) Applicant: RingCentral, Inc., Belmont, CA (US)

(72) Inventors: Arnaud Budkiewicz, Mountain View, CA (US); David Sipes, Hillsborough, CA (US); Simon Tumansky, Belmont, CA (US); Arindam Chakraborty, Belmont, CA (US); Yufei McLaughlin, San Mateo, CA (US); Martin Arastafar, Redwood City, CA (US); Vlad Vendrow, Belmont, CA (US); Phillip Liu, Belmont, CA (US); Dipkin Guglani, Belmont, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/831,201

(22) Filed: Jun. 2, 2022

Related U.S. Application Data

(62) Division of application No. 16/948,678, filed on Sep. 28, 2020, now Pat. No. 11,379,799.

(51) Int. Cl.
| | |
|---|---|
| G06Q 10/10 | (2023.01) |
| G06Q 10/1093 | (2023.01) |
| H04L 67/60 | (2022.01) |
| G06F 9/54 | (2006.01) |
| H04L 67/02 | (2022.01) |
| G06F 3/0482 | (2013.01) |

(52) U.S. Cl.
CPC ....... G06Q 10/1095 (2013.01); G06F 3/0482 (2013.01); G06F 9/542 (2013.01); G06F 9/547 (2013.01); H04L 67/02 (2013.01); H04L 67/60 (2022.05)

(58) Field of Classification Search
CPC .................................................. G06Q 10/1095
USPC ........................................................ 705/7.19
See application file for complete search history.

(56) References Cited

U.S. PATENT DOCUMENTS

| | | | | |
|---|---|---|---|---|
| 7,917,468 | B2* | 3/2011 | Ariel | G06F 16/285 707/625 |
| 8,600,794 | B2* | 12/2013 | Blair | G06Q 10/109 705/7.18 |
| 2009/0037843 | A1* | 2/2009 | Dong | G06Q 10/109 715/810 |
| 2014/0372162 | A1* | 12/2014 | Dhara | G06Q 10/1095 705/7.19 |
| 2015/0058057 | A1* | 2/2015 | Egan | G06Q 10/1095 705/7.19 |
| 2016/0148163 | A1* | 5/2016 | Beaumont | G06Q 10/1095 705/7.19 |

\* cited by examiner

*Primary Examiner* — Andy Ho

(57) ABSTRACT

A method includes receiving an input data from a host to schedule a meeting. The input data may include invitees to the meeting and a time/date associated with the meeting. A first and a second set of invitees from the invitees are determined. The first set of invitees is identified to start a pre-meeting meeting prior to the meeting scheduled at the time/date. The second set of invitees is identified to start the meeting at the time/date. It is appreciated that the pre-meeting meeting and the meeting are merged into a single meeting at a predetermined threshold of time.

16 Claims, 15 Drawing Sheets

SYSTEM AND METHOD FOR JOINING A MEETING AND SETUP THEREOF

RELATED APPLICATIONS

The instant U.S. Patent Application is a divisional application and claims the benefit and priority to the U.S. patent application Ser. No. 16/948,678 that was filed on Sep. 28, 2020, which is incorporated by reference herein in its entirety.

TECHNICAL FIELD

The present disclosure relates generally to the field of computer supported meeting/conferencing and setup thereof. More specifically, and without limitation, this disclosure relates to systems and methods for generating calendar invites for meetings/conferencing and managing and lunching the meetings/conferencing thereof.

BACKGROUND

Online and virtual meetings have become a prominent feature of conducting business in light of the multi-locational aspect of most businesses. Use and importance of online and virtual meetings have been exacerbated in recent months due to shelter-in-place restrictions related to the COVID-19 pandemic.

Unfortunately, online meetings are still at their infancy and manual in nature. For example, an invitee is still required to click on a link to join a meeting or to dial a call-in number at the time of the meeting to join. This is not only inefficient by requiring the invitee to manually take steps to join the meeting but it is also burdensome by requiring the invitee to keep track of time as to when to join so that the invitee is not late to the meeting, missing potentially important information.

Moreover, the meeting host/organizer that generates the meeting invite decides on whether any prior meeting to the actual meeting is needed, e.g., huddle with certain, individual team members to prepare before the actual meeting. Unfortunately, having the meeting host/organizer decide on whether a prior meeting to the actual meeting is needed is burdensome and error prone since no prior meeting may be needed for a specific meeting instance or one may be needed but mistakenly not scheduled by the host/organizer.

Furthermore, different individuals have different habits and work obligations that are completely ignored by the scheduling system since it is manual in nature. For example, certain individuals may be habitually late to meetings whereas others may have back to back and overlapping meetings that prevent them from joining a meeting on time on a regular basis. The scheduling system's lack of insight causes inefficiencies, e.g., keeping everyone waiting.

SUMMARY

Accordingly, a smart and intelligent scheduling/conferencing system is desired. In some embodiments, the scheduling/conferencing system provides the invitees the option when the invitation is received that if selected at the time of responding to the invitation, e.g., accepting the meeting, accepting the meeting tentatively, declining the meeting, etc., to allow the invitees to join the meeting automatically. For example, the system may call the invitees that selected to join the meeting automatically for the scheduled meeting. In some other examples, the invitee's device automatically calls into the meeting or launches the link for the meeting if the invitee at the time of responding to the meeting invitation chose to do so.

In some embodiments, the smart and intelligent scheduling/conferencing system automatically determines whether a premeeting meeting is needed, e.g., by evaluating prior texts in chat rooms, electronic mail (email) exchanges, whether the invitees are from the same organization or a mix with external organizations, whether the invitees are team members from the same group as opposed to invitees from different teams within the same organization, the title of the invitees, the title of the meeting, etc. In some embodiments, artificial intelligence (AI) and machine learning (ML) is applied to determine whether a premeeting meeting is needed. If a premeeting meeting is needed, then the premeeting meeting and the actual meeting are merged at the time/date for the actual meeting into a single meeting.

In some embodiments, the smart and intelligent scheduling/conferencing system tracks the invitee's profile, e.g., tardiness profile, calendar profile, title of the invitee, level within the organization, etc. Based on the profile, the calendar invite for certain invitees may have a different time in comparison to others, e.g., the meeting scheduled for tardy individuals may be scheduled a few minutes early in comparison to punctual invitees, the meeting may be scheduled earlier for junior team members in comparison to the executive team members, etc. Moreover, the system may start the meeting without the host being present once the required invitees are present, once a quorum has been reached, etc. In some embodiments, reminders at regular intervals may be sent to the host to join the meeting/conference if the host is late by a particular amount of time. It is appreciated that the system may automatically call the host/organizer at the time of the scheduled meeting or after a certain period of time after the scheduled time for the meeting has passed.

These and other features and aspects of the concepts described herein may be better understood with reference to the following drawings, description, and appended claims.

DETAILED DESCRIPTION

Figure 1:
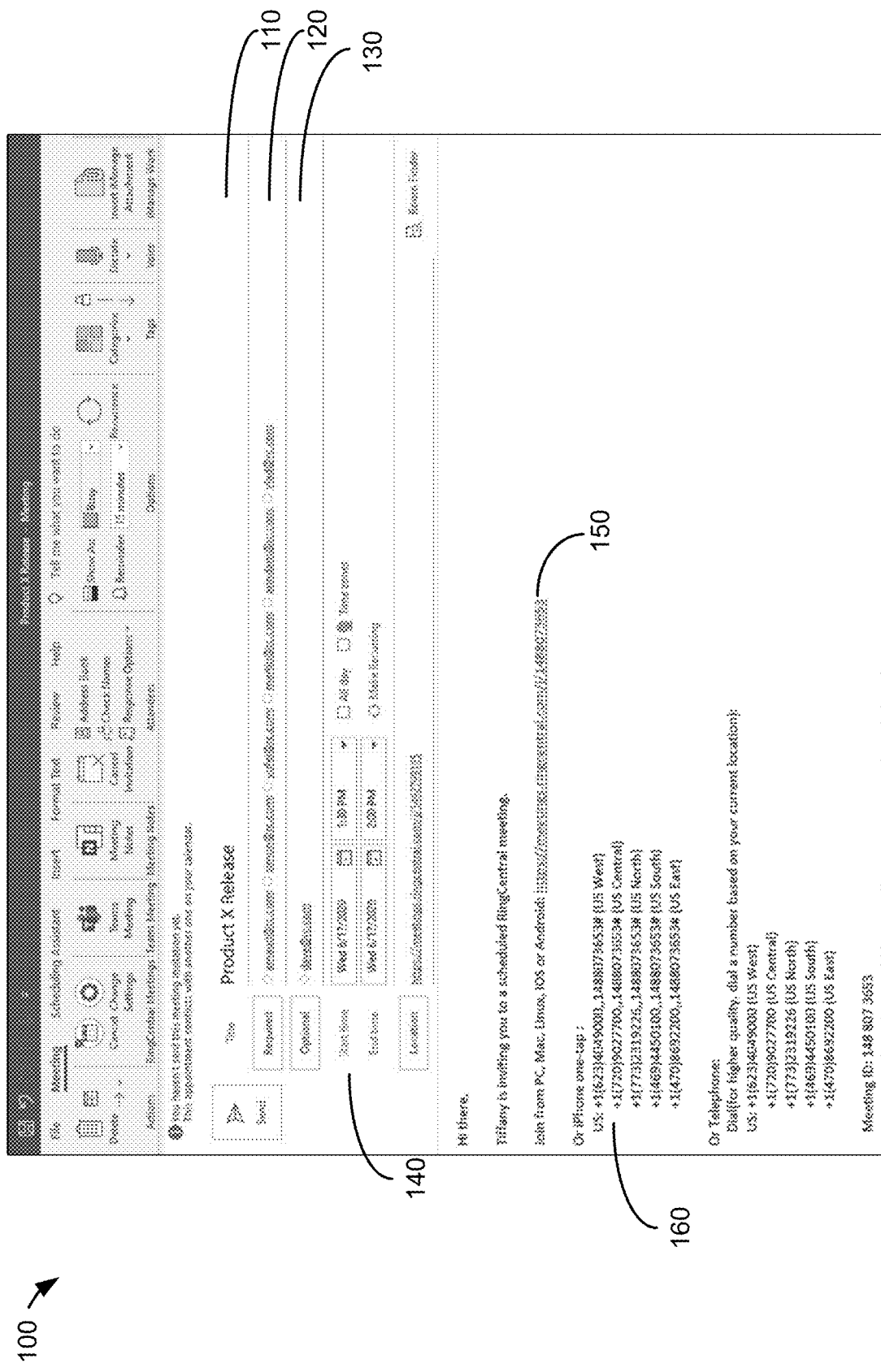
FIG. 1 is a diagram showing an example of a graphical user interface (GUI) associated with creation of an online calendar invite for a meeting according to some embodiments.

The example embodiments described herein are directed to a scheduling/conferencing system (hereinafter also referred to as the system). Moreover, it is appreciated that the embodiments are described with respect to certain applications, e.g., Microsoft® Outlook®, RingCentral®, etc., but the embodiments are equally applicable to any applications. For example, the embodiments may be implemented on online applications or may be web browser based.

The system provides the invitees an option on how to join the meeting. For example, a GUI icon may be provided when the calendar invite is sent to allow the invitee to choose, at the time that the invitee is responding to the calendar invite, to have the system call the invitee directly at or approximately at the time that the meeting is scheduled. In some other nonlimiting examples, the GUI icon allows the invitee to choose, at the time that the invitee is responding to the calendar invite, to have the invitee's device, e.g., smart phone, computer, tablet, etc., call into the meeting automatically and without invitee's further intervention at or approximately at the time that the meeting is scheduled. In some embodiments, the invitee's device, e.g., computer, smartphone, tablet, etc., automatically launches the link to join the meeting without an invitee's further intervention at or approximately at the time that the meeting is scheduled, if selected to do so at the time of responding to the calendar invite.

The system also provides a method for meeting invitees to review their choices and make changes to their previously chosen options on how to join a scheduled meeting. In some nonlimiting examples, an invitee who responded to a calendar invite with a request for the scheduling/conferencing system to call the invitee at the appointed meeting time may change their response to accept to join the meeting manually, allowing the invitee to control when they join. In some other nonlimiting examples, an invitee who previously responded to accept a meeting invitation and join manually may change their response to have the invitee's device, e.g. smart phone, computer, tablet, etc., call into the meeting automatically and without the invitee's further intervention at or approximately at the time that the meeting is scheduled.

The scheduling/conferencing system according to some nonlimiting examples has a built-in intelligence that automatically determines whether a premeeting meeting should be scheduled for a meeting. For example, the scheduling/conferencing system may apply AI and ML algorithms to data captured from various sources, such as text/chat from chat rooms, email exchanges, whether the invitees are from the same organization or from different organizations, title of the invitees, position/level of invitees within their organization, title of the meeting, prior meeting invitees, prior meetings and topics thereof, etc., to determine whether a premeeting meeting should be scheduled. For example, the scheduling/conferencing system may determine that since executive team members are presenting to the CEO of the company, a premeeting meeting, e.g., 15 minutes before the actual meeting, 30 minutes before the meeting, etc., may be needed to tie up loose ends before the actual meeting with the CEO. In one nonlimiting example, the system may detect that the meeting is between invitees from one organization with outside vendors and determine that a premeeting meeting is desired to go over the talking points before the actual meeting. In another nonlimiting example, it may be determined based on prior email exchanges and conversation in chat rooms that certain features of a product has not been locked down for the meeting, and as such, there is a need to schedule a premeeting meeting prior to the actual meeting to present to the customers. In yet another nonlimiting example, the system may recognize certain meeting invitees from a prior meeting which was scheduled with a premeeting meeting and recognize that a premeeting meeting should be scheduled for the actual meeting being scheduled based on characteristics of the prior scheduled meeting. The premeeting meeting, once scheduled, starts prior to the actual meeting automatically without a need for the organizer/host having to manually schedule the premeeting meeting. It is appreciated that the two meetings (i.e. premeeting meeting and the actual meeting) are merged into a single meeting at the time or approximately at the time scheduled for the actual meeting. It is appreciated that, in some embodiments, the premeeting meeting and the actual meeting are two separate meetings with different meeting identification numbers (IDs) and are setup as two different meetings. Accordingly, the invitees of the actual meeting that are not invited to the premeeting meeting cannot join the premeeting meeting because the premeeting meeting and the actual meeting are setup as two separate meetings with different IDs.

In some nonlimiting examples, scheduling and launching the meeting is managed in an intelligent and smart fashion. It is appreciated that in some embodiments, user profiles, e.g., tardiness profile, calendar profile, title of the invitee, level within the organization, past attendance record, etc., may be tracked. For example, the scheduling/conferencing system may automatically approximate how late each invitee may join the scheduled meeting based on the invitees' user profile such as their tardiness profile, calendar profile, past attendance record, etc. The meeting invite and the timing for different invitees may be slightly different from one another based on their profile, e.g., for one invitee, the meeting may be scheduled exactly at the intended time for the meeting while for another, based on his tardiness profile, it may be scheduled at 5 minutes prior to the meeting. In some nonlimiting examples, the meeting may be scheduled early for most invitees based on the level of other invitees within the meeting, e.g., most invitees may be automatically scheduled at 3 minutes prior to the actual time if the meeting is with a CEO of the organization. In some nonlimiting examples, the information with respect to the tardiness of invitees may be displayed in the meeting card, e.g., calendar invite. For example, the calendar invite may display that John is typically 5 minutes late to meetings whereas Tiffany joins promptly on time to meetings. Moreover, the estimation may be further based on each invitee's current calendar and not entirely based on their past behavior. It is also appreciated that unlike the conventional systems, the intelligent scheduling/conferencing system enables the meeting/conference to start without the host's presence if a certain criteria has been met, e.g., a quorum has been reached, required invitees are present, etc. Additionally, unlike the conventional systems, the intelligent scheduling/conferencing system sends repeated reminders to the host/organizer if it is detected that the host/organizer is late to the meeting. Sending repeated reminders are not necessarily limited to the meeting host. Based on tardiness profiles of meeting invitees, the system may send reminders to specific invitees at regular intervals before the meeting to ensure specific invitees join the meeting on time. Moreover, in one nonlimiting example, the intelligent scheduling/conferencing system automatically calls the host/organizer once it detects that the host/organizer has not joined the meeting and after a certain threshold of time has passed, e.g., 5 minutes after the meeting has been scheduled, 10 minutes after the meeting has been scheduled, etc. It is appreciated that in some nonlimiting examples, a plurality of preselected options may be rendered to the invitees to choose from in case the invitee is running late. For example, a preselected option in the calendar invite may be to select that the invitee is running 5 minutes late, 10 minutes late, etc., or that the invitee will not be able to make the meeting even though the meeting was previously accepted.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "rendering", "utilizing", "launching", "calling", "merging", "starting", "accessing", "sending", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Referring now to FIG. 1, a diagram showing an example of a GUI 100 associated with creation of an online calendar invite for a meeting according to some embodiments is shown. In some embodiments, the GUI 100 may include various fields, such as the title of the meeting 110, the required invitees 120, optional invitees 130, the time/date 140 of the meeting, the link 150 that, once instantiated, launches the meeting, and the call-in numbers 160. The meeting is being scheduled by the host/organizer, e.g., Tiffany in this example.

It is appreciated that other fields and options may be available as shown but not discussed. In this nonlimiting example, the meeting title is for "Product X Release" as shown in the title field 110. The required invitees 120 as indicated by the host are Arnaud, Simon, Yufei, Martin, Arindam, and Vlad while the optional invitee 130 is Dave. The host sets the date/time 140 of the meeting. In this nonlimiting example, the meeting is set through Microsoft® Outlook® for a RingCentral® conferencing/meeting. The link 150 and/or the call-in numbers 160 may be provided by the host or it may be automatically populated through the RingCentral® conferencing application. It is appreciated that use of Microsoft® Outlook® and RingCentral® for scheduling the meeting invite and for the actual meeting is for illustrative purposes and should not be construed as limiting the scope of the embodiments. For example, in some nonlimiting examples the scheduling and the actual meeting/conferencing may be web browser based. Once the meeting invitation is setup, it is transmitted to each of the invitees, e.g., required invitees as well as the optional invitees.

Referring now to FIGS. 2A-2D, diagrams illustrating examples of GUIs associated with invitations received by invitees and options associated therewith according to some embodiments are shown. The invitation as received may include various GUI icons and additional fields with information regarding how to join the meeting/conference. In this embodiment, the link 240 and the call-in numbers 250 are included in the meeting invite should the invitee choose to join the meeting/conference manually. The link 240 and the call-in numbers 250 may correspond to the link 150 and the call-in numbers 160 of FIG. 1. Additionally GUI icons 210-230 are included. For example, the GUI icon 210 is the GUI icon allowing the invitee to choose to respond to the meeting invitation and accept the meeting invite at the time/date indicated by the host/organizer. The GUI icon 220 is the GUI icon that once selected responds to the host/organizer that the invitee has tentatively accepted to attend the meeting/conference call. In contrast, GUI icon 230 once selected responds to the host/organizer that the invitee has declined to attend the meeting.

Figure 2A:
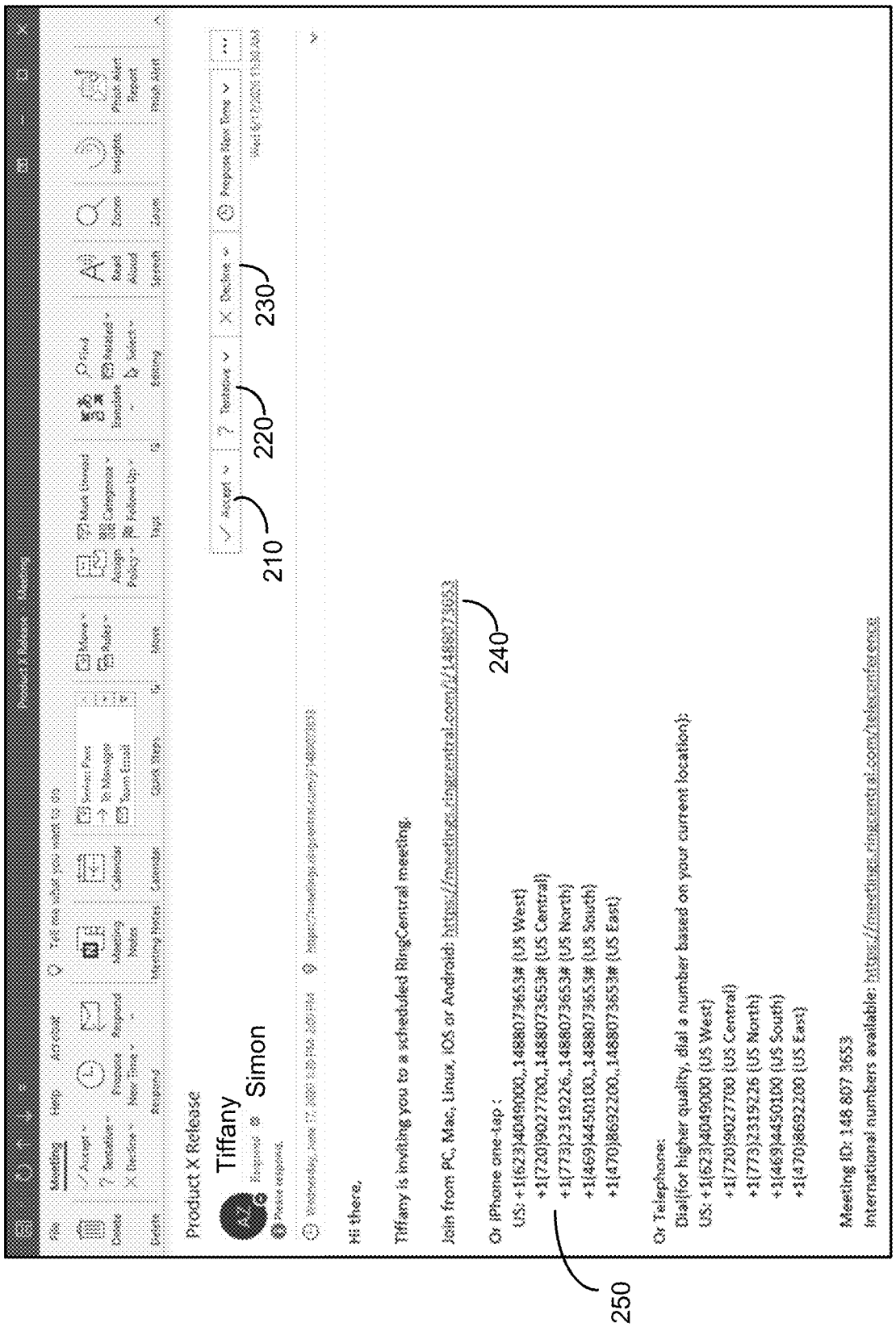
FIGS. 2A-2D are diagrams illustrating examples of GUIs associated with invitation received by invitees and options associated therewith according to some embodiments.
Figure 2B:
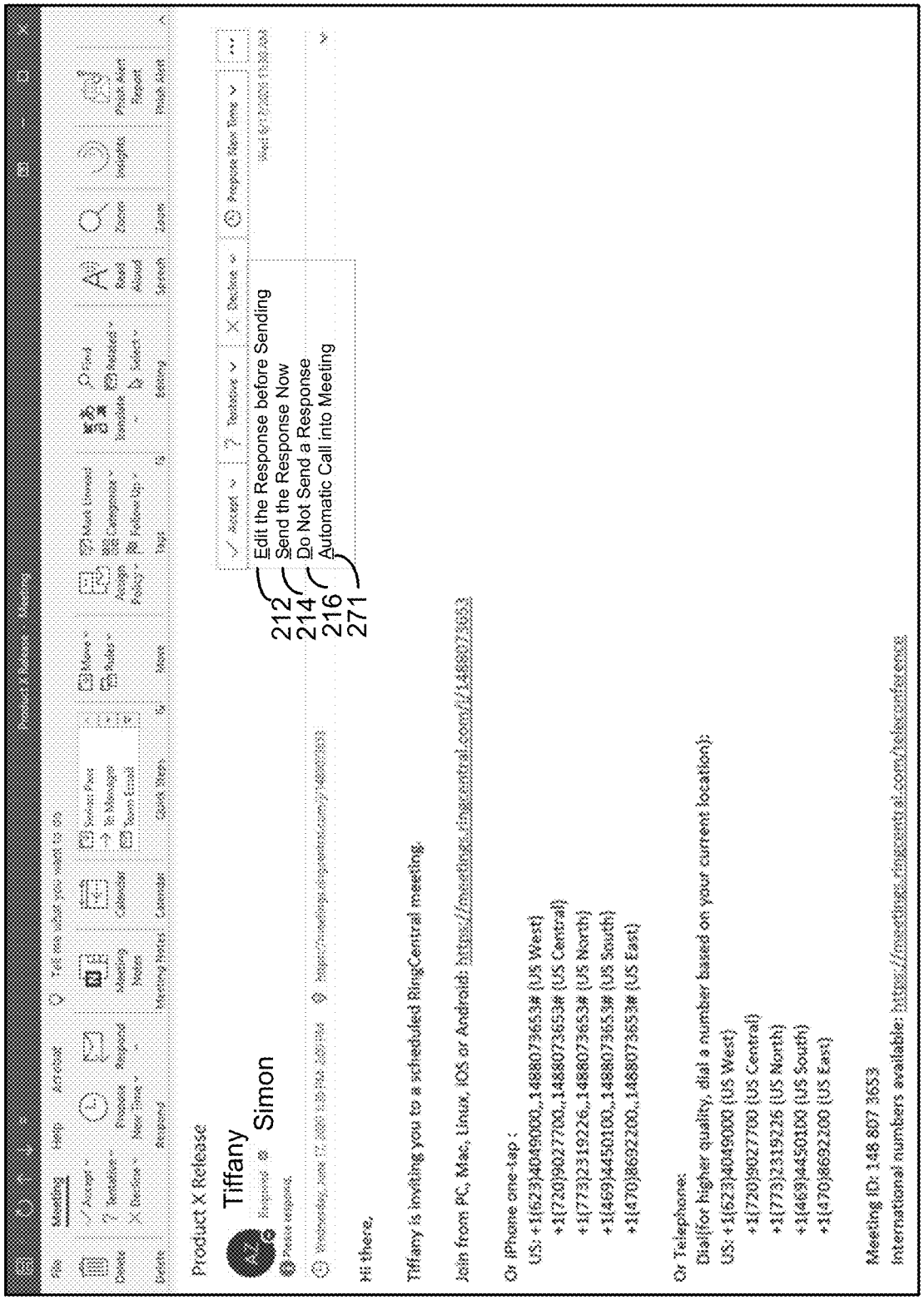

Referring now to FIG. 2B, a GUI rendition for accepting the meeting invite is shown. Once the GUI icon 210 is selected, a plurality of options is provided. For example, if the GUI icon 210 is selected, a dropdown menu may be displayed. In this nonlimiting example, the invitee may be provide an option to accept the meeting invite and edit the response before sending 212, accept the meeting invite and send the response now 214, accept the invite but do not send a response 216, or accept the meeting invite and choose to automatically call into the meeting 271 at or approximately at the time of the meeting. For example, if the GUI icon 271 selected, then the invitee's device may automatically call into the meeting at the date/time of the meeting. In this particular example, and for illustrative purposes, the meeting time is scheduled at 1:30 pm and therefore the invitee's device calls into the meeting at 1:30 pm. It is appreciated that in some embodiments, automatically calling into the meeting may occur within a particular threshold of time from the actual meeting time, e.g., 30 seconds before the actual meeting time/date or 1:29:30 pm, 10 seconds before the actual meeting time/date or 1:29:50 pm, 0 seconds (i.e. exact meeting time) or 1:30 pm, 10 seconds after the actual meeting time or 1:30:10, etc.

Figure 2C:
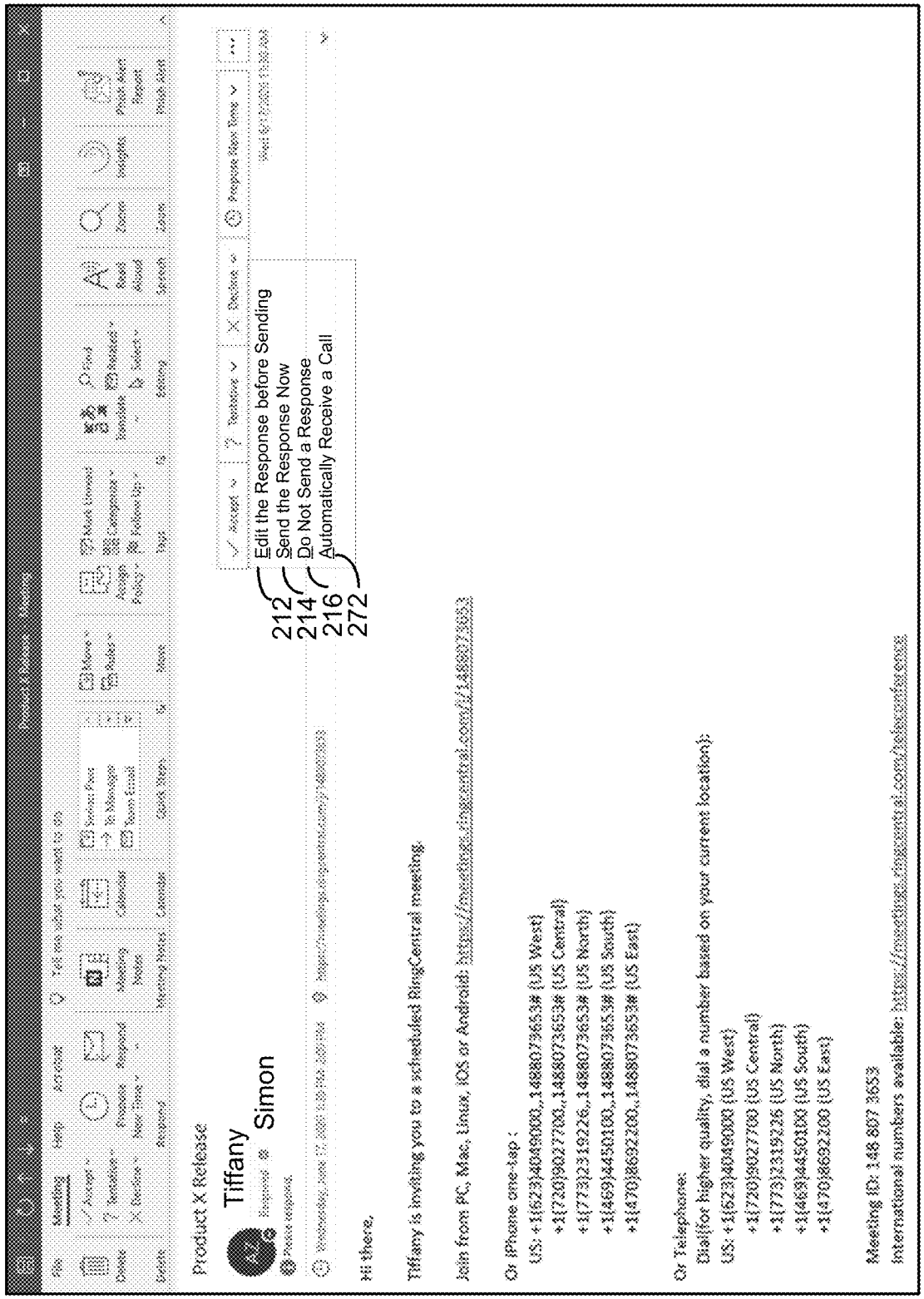

Referring now to FIG. 2C, the invitee may be provided with the option to accept the meeting invite and to automatically receive a call 272, e.g., from the scheduling/conferencing system, at or approximately at the time of the meeting. In other words, at the time that the invitee is responding to whether the invitee will be attending the meeting/conferencing, the invitee may choose to have the scheduling/conferencing system call the invitee's device at or approximately at the time of the scheduled meeting. For example, if the GUI icon 272 selected, then the invitee's device may automatically receive a call, from the scheduling/conferencing system, at or approximately at the time of the scheduled meeting. In this particular example and for illustrative purposes the meeting time is scheduled at 1:30 pm and therefore the invitee's device receives a call, from the scheduling/conferencing system, at or approximately at the time of the scheduled meeting, hence at or around 1:30 pm. It is appreciated that in some embodiments, the call may be received within a particular threshold of time from the actual meeting time, e.g., 30 seconds before the actual meeting time/date or 1:29:30 pm, 10 seconds before the actual meeting time/date or 1:29:50 pm, 0 seconds (i.e. exact meeting time) or 1:30 pm, 10 seconds after the actual meeting time or 1:30:10, etc.

Figure 2D:
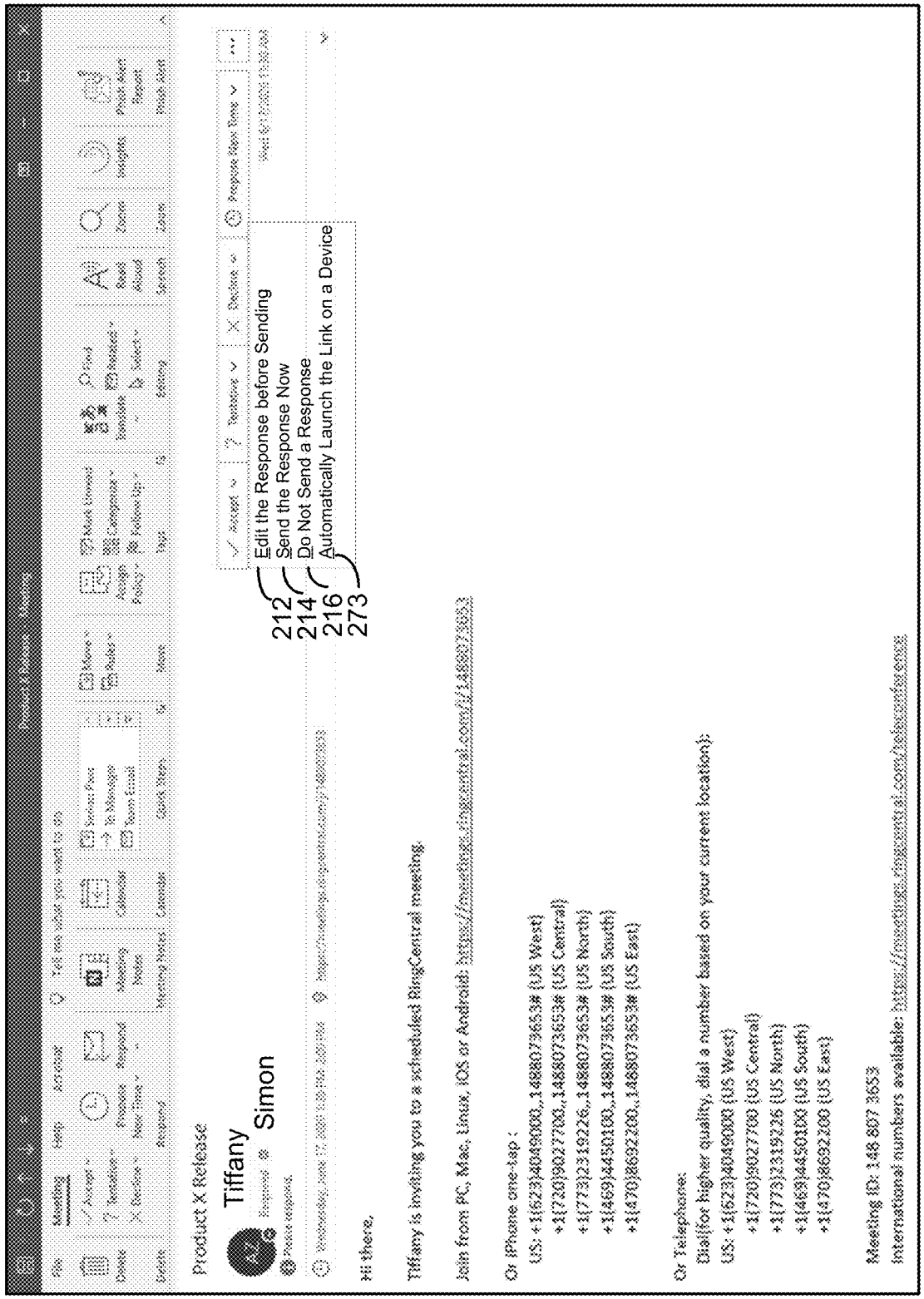

Referring now to FIG. 2D, the invitee may be provided with the option to accept the meeting invite and to automatically instantiate the link and launch the meeting on a device 273 at or approximately at the time of the meeting. Instantiating the link launches the meeting for the invitee. In other words, at the time that the invitee is responding to whether the invitee will be attending the meeting/conferencing, the invitee may choose to have the invitee's device instantiate the link to start the meeting at or approximately at the time of the scheduled meeting. For example, if the GUI icon 273 selected, then the invitee's device may automatically instantiate the link in the meeting invite to start the meeting at or approximately at the time of the scheduled meeting. In this particular example and for illustrative purposes the meeting time is scheduled at 1:30 pm and therefore the invitee's device instantiates the link at or approximately at the time of the scheduled meeting, hence at or around 1:30 pm. It is appreciated that in some embodiments, the link may be instantiated within a particular threshold of time from the actual meeting time, e.g., 30 seconds before the actual meeting time/date or 1:29:30 pm, 10 seconds before the actual meeting time/date or 1:29:50 pm, 0 seconds (i.e. exact meeting time) or 1:30 pm, 10 seconds after the actual meeting time or 1:30:10, etc.

It is appreciated that in some embodiments, the invitee may select the device that the invitee would like to use for attending the meeting. For example, the invitee may by default choose the device used in responding to the meeting invite to be used for attending the meeting. In other words, the same device may be used to call into the meeting, receive a call from the scheduling/conferencing system, or the same device may be used to automatically launch the link to attend the meeting. In one nonlimiting example, the invitee may be provided an option to select a different device, e.g., provide a telephone number to receive a call at or approximately the time of the meeting, provide a telephone number to tap the device associated with the provided telephone number to automatically call into the meeting or to automatically launch the link to join the meeting. It is appreciated that the chosen device may be identified by telephone number, email address or other unique device identifier associated with a device to launch the meeting.

Figure 3:
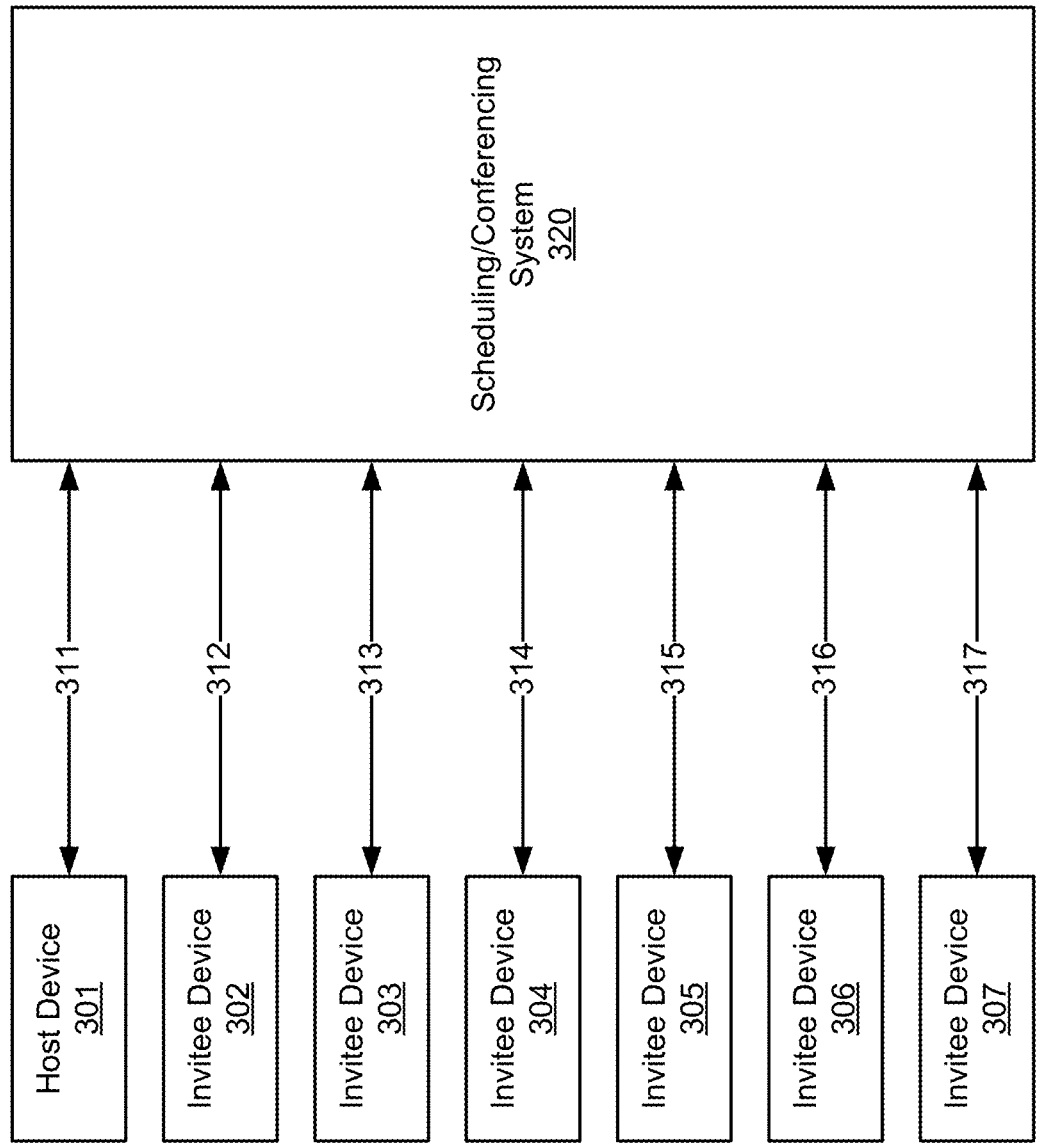
FIG. 3 is an illustrative diagram for communication between invitees of a meeting and the scheduling system according to some embodiments.

Referring now to FIG. 3, an illustrative diagram for communication between invitees of a meeting and the scheduling system according to some embodiments is shown. In this embodiment, the scheduling/conferencing system 320 manages the meeting schedules and conferencing. For example, the scheduling/conferencing system 320 enables the host/organizer to schedule meetings and manage meetings but handles launching the meeting, allowing invitees to join the meeting, etc. In this illustrative example, the host/organizer schedules a meeting, e.g., via a host device 301. The host/organizer has scheduled a meeting for invitees 302-307. In this illustrative example, invitee device 303 is configured by the invitee to automatically receive a call from the scheduling/conferencing system 320 at or approximately at the scheduled time for the meeting. It is appreciated that the invitee device 303 may be configured through the responding process to the calendar invite, e.g., selecting the GUI icon 272. In comparison the invitee device 305 is configured by the invitee to automatically call into the meeting by dialing the call-in number using the invitee device 305 at or approximately at the scheduled time for the meeting. It is appreciated that the invitee device 305 may be configured through the responding process to the calendar invite, e.g., selecting the GUI icon 271. Furthermore and for illustrative purposes, the invitee device 306 is configured by the invitee to automatically instantiate the link in the calendar invite at or approximately at the scheduled time for the meeting. It is appreciated that the invitee device 306 may be configured through the responding process to the calendar invite, e.g., selecting the GUI icon 273. It is appreciated that the device used to launch the meeting and/or premeeting may or may not be the same device at which the calendar invite was accepted, rejected, etc. In one nonlimiting example, the meeting and/or premeeting may be launched by clicking on a link and in some examples the meeting and/or premeeting may be launched automatically.

In this nonlimiting example, the host device 301 connects 311 to the scheduling/conferencing system 320 at or approximately at the time of the scheduled meeting. In contrast, the invitee device 303 receives a call 313 from the scheduling/conferencing system 320 at or approximately at the scheduled time for the meeting, the invitee device 305 automatically calls 315 into the scheduling/conferencing system 320 at or approximately at the scheduled time for the meeting, and the invitee device 306 automatically instantiates a link to establish a connection 316 with the scheduling/conferencing system 320 at or approximately at the scheduled time for the meeting. It is appreciated that invitee devices 302, 304, and 307 also join the meeting through one of the means mentioned above for invitee devices 303, 305, 306, or through a conventional means by manually dialing the number 160, 250 to join the meeting or manually instantiating the link 160, 240 to connect to the meeting. As such, invitee devices 302, 304, and 307 also connect to the scheduling/conferencing system 320 and join the meeting through connections 312, 314, and 317 respectively.

Figure 4:
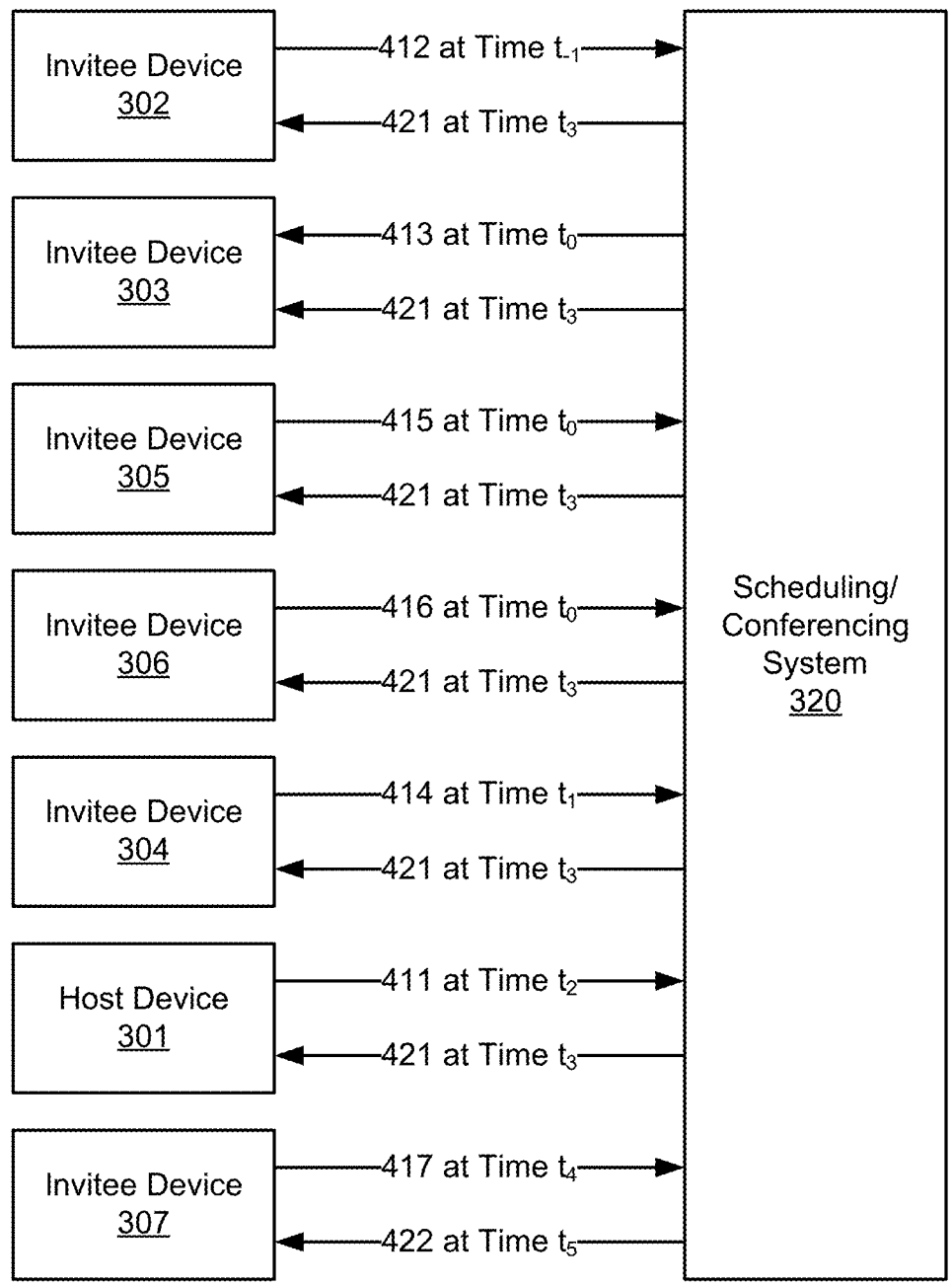
FIG. 4 is another illustrative diagram for communication between invitees of a meeting and the scheduling system according to some embodiments.

Referring now to FIG. 4, another illustrative diagram for communication between invitees of a meeting and the scheduling system according to some embodiments is shown. FIG. 4 is substantially similar to that of FIG. 3 and illustrates the timing and various actions taken to join the meeting. In this example, invitee device 302 contacts 412 the scheduling/conferencing system 320 at time $t_{-1}$. The invitee device 303 receives a call 413 from the scheduling/conferencing system 320 at time $t_0$ that is after the time $t_{-1}$. It is appreciated that time $t_0$ is the scheduled meeting time. The invitee device 305 automatically calls 415 the scheduling/conferencing system 320 at time $t_0$. The invitee device 306 automatically instantiates the link in the meeting invite and contacts 416 the scheduling/conferencing system 320 at time $t_0$. The invitee device 304 contacts 414 the scheduling/conferencing system 320 at time $t_1$. It is appreciated that time $t_1$ is after time $t_0$. It is further appreciated that in this illustrative example, no invitee has been allowed to join the meeting without the host/organizer. But it is appreciated that the embodiments should not be construed as limited thereto. For example, the invitees may be allowed to start the meeting without the host/organizer if there is a quorum, if the required invitees are present, etc. It is appreciated that the number set for a quorum can be set by a user, e.g., host, or it may be set as a default depending on the number of invitees, etc. In some embodiments, the number needed to reach a quorum may be provided to the host only and/or to all invitees of the meeting. In one nonlimiting example, the number of invitees needed to reach a quorum may be provided to a subset of the invitees, e.g., required participants as opposed to optional participants, etc. In this example, the host device 301 is late to the meeting and contacts 411 the scheduling/conferencing system 320 at time $t_2$. It is appreciated that in one nonlimiting example, in response to the host device 301 contacting the scheduling/conferencing system 320, the scheduling/conferencing system 320 responds 421 by allowing the invitee devices 302, 303, 305, 306, 304, and 301 to join the meeting at time $t_3$. As such, the meeting starts at time t3 with invitee devices 302, 303, 305, 306, 304 and the host device 301. It is appreciated that the invitee device 307 at a later time $t_4$ contacts 417 the scheduling/conferencing system 320 to join the meeting. The scheduling/conferencing system 320 responds 422 at time $t_5$ joining the invitee device 307 to the meeting.

Figure 5:
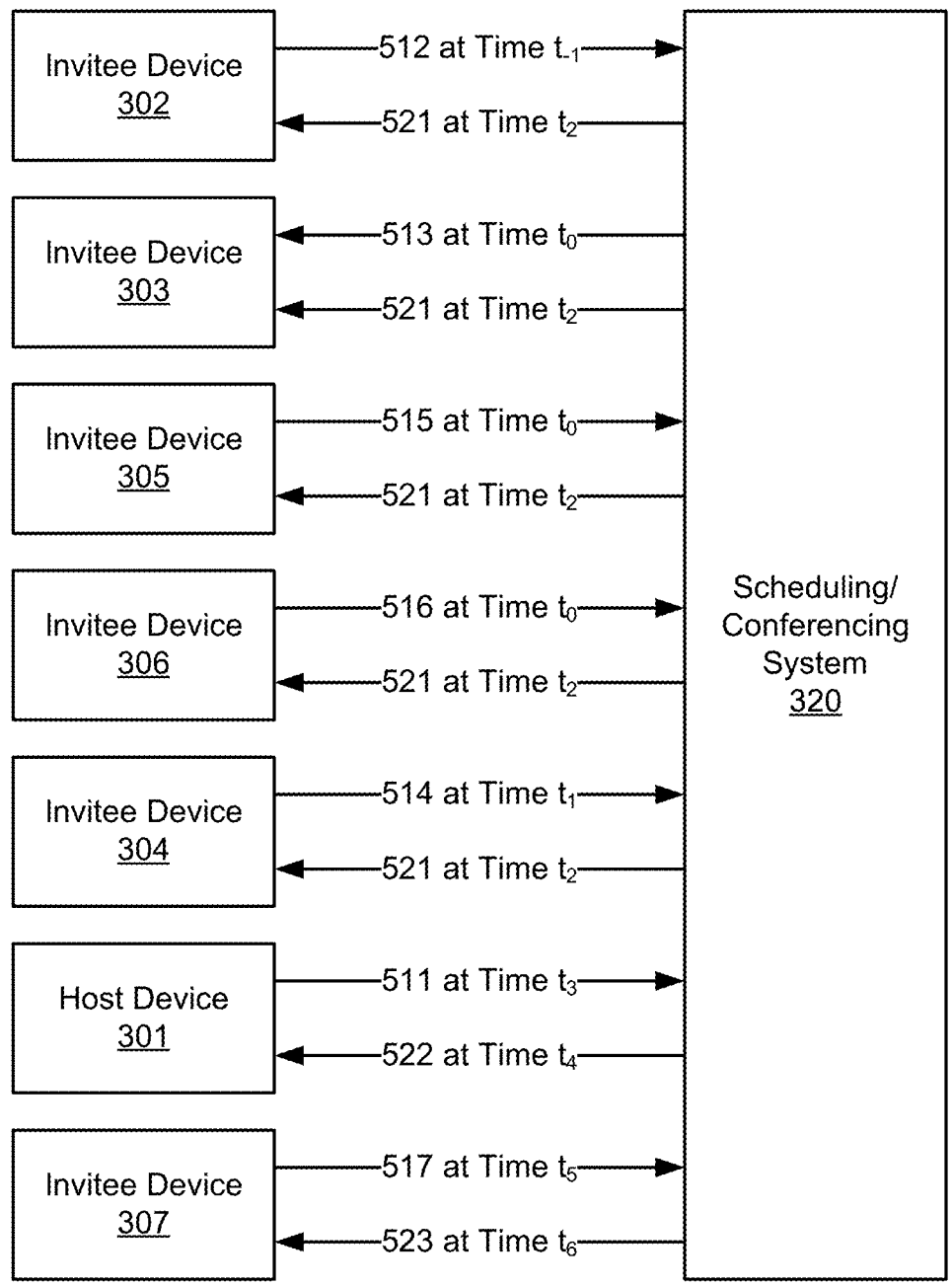
FIG. 5 is yet another illustrative diagram for communication between invitees of a meeting and the scheduling system according to some embodiments.

Referring now to FIG. 5, yet another illustrative diagram for communication between invitees of a meeting and the scheduling system according to some embodiments is shown. In this example, the invitee device 302 contacts 512 the scheduling/conferencing system 320 at time $t_{-1}$. The invitee device 303 receives a call 513 from the scheduling/conferencing system 320 at time $t_0$ that is after time $t_{-1}$. The invitee device 305 automatically calls 515 the scheduling/conferencing system 320 at time $t_0$. The invitee device 306 automatically instantiates a link in the meeting invite to contact 516 the scheduling/conferencing system 320 at time $t_0$. The invitee device 304 contacts 514 the scheduling/conferencing system 320 at time $t_1$. It is appreciated that at this point the host/organizer has not joined the meeting and the meeting has not started. However, the invitee device 304 joining may result in a quorum to be reached. It is appreciated that the invitee device 304 joining may result in the required invitees to be present, e.g., based on title of the invitee, or required as designated by the host/organizer at the time of scheduling the meeting, etc. Thus, the scheduling/conferencing system 320 responds 521 at time $t_2$ connecting the invitee devices 302, 303, 305, 306, and 304 to the scheduled meeting that was scheduled for time $t_0$. It is appreciated that in this embodiment, the meeting starts without the host/organizer joining the meeting because quorum was reached, or required invitees were present, etc. It is appreciated that the host device 301 contacts 511 the scheduling/conferencing system 320 at time $t_3$ to join the meeting and the scheduling/conferencing system 320 responds 522 at time $t_4$ connecting the host device 301 to the meeting. It is appreciated that invitee device 307 may contact 517 the scheduling/conferencing system 320 at time $t_5$ to join the meeting and the scheduling/conferencing system 320 responds 523 at time $t_6$ to connect the invitee device 307 to the meeting that has already started. It is appreciated that the need to reach a quorum and start the meeting or the number of required invitees to be present may each be a different criteria that triggers the meeting to start once satisfied. In some embodiments, a criteria to start the meeting may be based on the importance level of the invitees, e.g., title of the invitees such as CEO, CFO, program manager, etc. In other words, in an organization the level of importance may be based on the organization chart of that organization. In some nonlimiting examples, the level of importance may be determined based on the content of the meeting and how that content aligns with expertise of the invitee(s).

Figure 6:
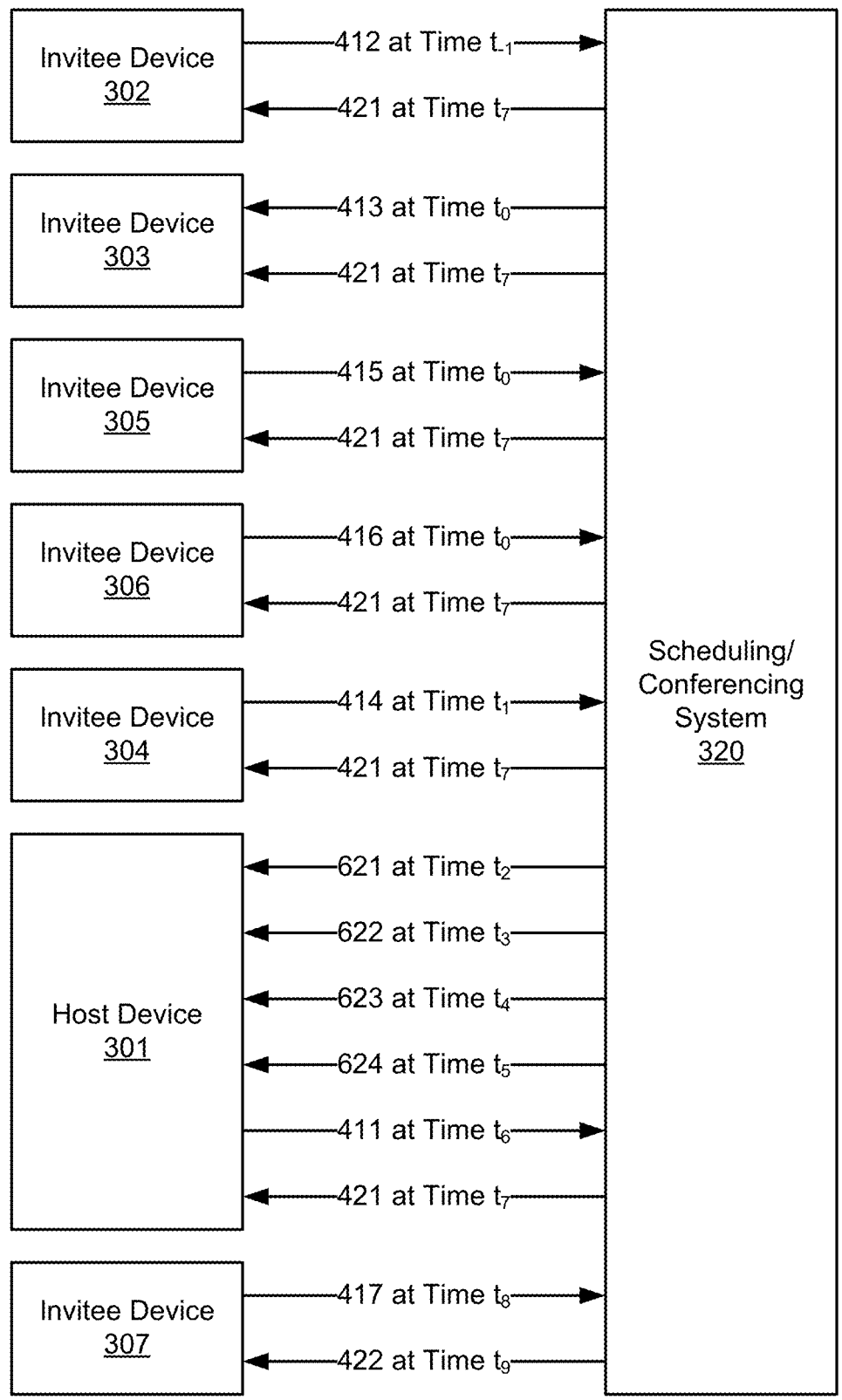
FIG. 6 is still another illustrative diagram for communication between invitees of a meeting and the scheduling system according to some embodiments.

Referring now to FIG. 6, still another illustrative diagram for communication between invitees of a meeting and the scheduling system according to some embodiments is shown. FIG. 6 is substantially similar to that of FIG. 4. In this illustrative example, invitee device 302 contacts 412 the scheduling/conferencing system 320 at time $t_{-1}$. The invitee device 303 receives a call 413 from the scheduling/conferencing system 320 at time $t_0$ that is after the time $t_{-1}$. It is appreciated that time $t_0$ is the time that the meeting is scheduled for. The invitee device 305 automatically calls 415 the scheduling/conferencing system 320 at time $t_0$. The invitee device 306 automatically instantiates the link in the meeting invite and contacts 416 the scheduling/conferencing system 320 at time $t_0$. The invitee device 304 contacts 414 the scheduling/conferencing system 320 at time $t_1$. It is appreciated that time $t_1$ is after time $t_0$. It is further appreciated that in this illustrative example, no invitee has been allowed to join the meeting without the host/organizer. But it is appreciated that the embodiments should not be construed as limited thereto. For example, the invitees may be allowed to start the meeting without the host/organizer if there is a quorum, if the required invitees are present, etc. (as described in FIG. 5). In this example, the host device 301 is late to the meeting. The scheduling/conferencing system 320 sends reminders 621, 622, 623, and 624 to the host device 301, e.g., at regular intervals, to remind the host that the host is late to the meeting scheduled at time $t_0$. For example, the scheduling/conferencing system 320 sends a reminder 621 at time $t_2$, a reminder 622 at time $t_3$, a reminder 623 at time $t_4$, and a reminder 624 at time $t_5$, to the host device 301. The host device 301 finally contacts 411 the scheduling/conferencing system 320 at time $t_6$. The scheduling/conferencing system 320 responds 421 at time t7 and connects the invitee devices 302, 303, 305, 306, 304, and the host device 301 to the meeting. In other words, the invitee devices 302, 303, 305, 306, and 304 are prevented from starting the meeting without the host/organizer, unlike the illustrative example of FIG. 5. It is appreciated that the invitee device 307 at a later time $t_8$ contacts 417 the scheduling/conferencing system 320 to join the meeting. The scheduling/conferencing system 320 responds 422 at time $t_9$ joining the invitee device 307 to the meeting. It is appreciated that in some embodiments, the scheduling/conferencing system 320 may automatically initiate a call to the host device 301 in response to a certain period of time after the actual meeting time elapsing.

Figure 7:
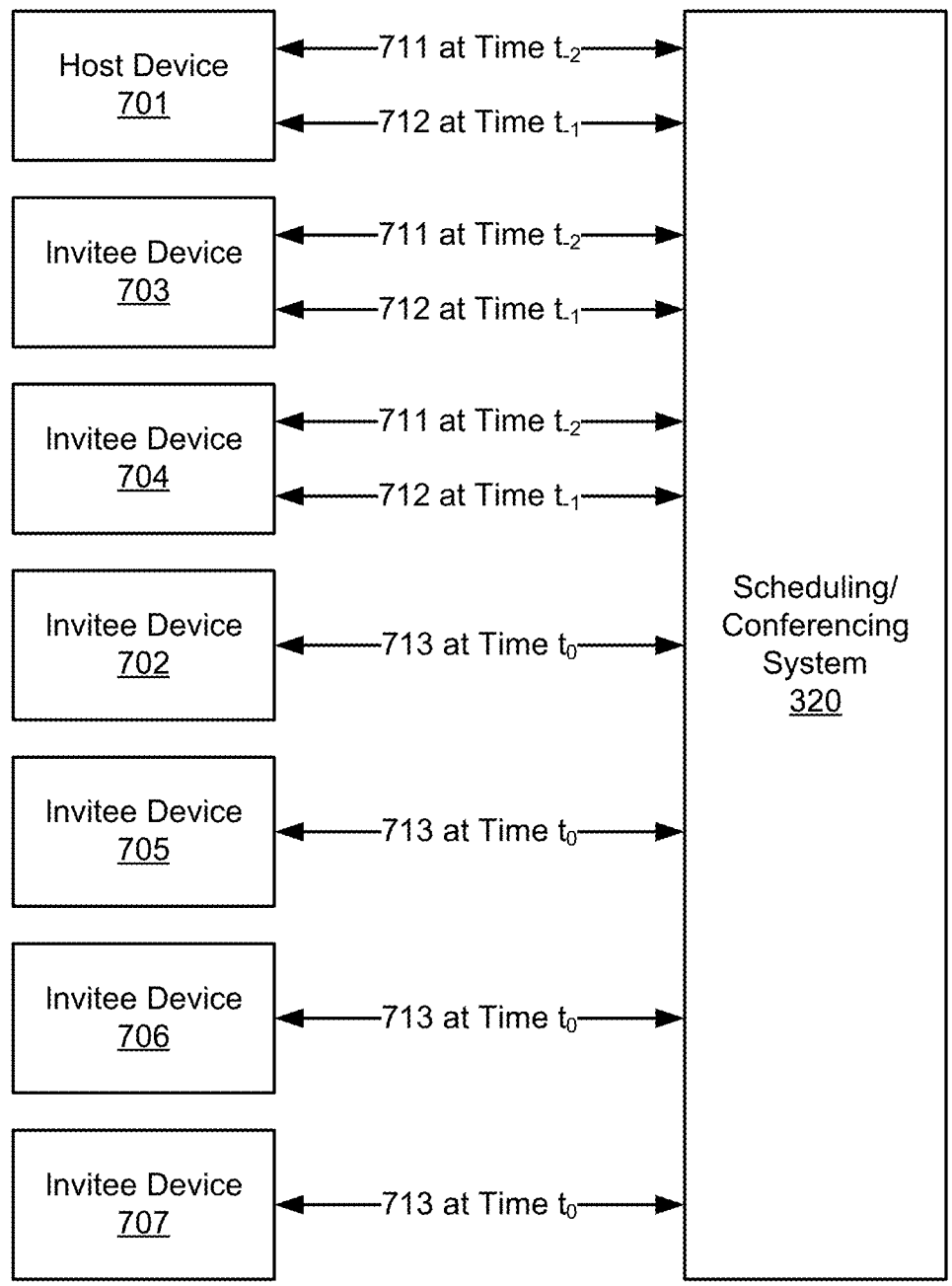
FIG. 7 is a diagram illustrating communication between invitees of a meeting and the scheduling system and a determination to form a premeeting meeting according to some embodiments.

Referring now to FIG. 7, a diagram illustrating communication between invitees of a meeting and the scheduling system and a determination to form a premeeting meeting according to some embodiments is shown. It is appreciated that in some instances it may be determined that a meeting prior to the actual meeting (also referred to as premeeting meeting) may be needed. For example, a premeeting meeting may be desired to go over the talking points when team members within the same organization have a meeting with external members, e.g., vendors, etc. In another example, a premeeting meeting may be desired when team members are within the same team but are meeting with members from another team within the same organization in order to finalize a presentation. In yet another example, a premeeting meeting may be desired based on the title of the invitees. For example, a premeeting meeting may be desired when meeting the CEO of the organization to ensure that certain meeting attendees have prepared everything they wish to present to the CEO. In other words, a premeeting meeting can be viewed as a huddle prior to the actual meeting. It is appreciated that in some embodiments the determination whether a premeeting meeting is desired may be manual, e.g., indicated by the host/organizer when setting up the meeting invite, or it may be automatic. The scheduling/conferencing system 320 may access various data repositories to determine whether a premeeting meeting is needed. For example, the scheduling/conferencing system 320 may access the human resources (HR) database to access the invitee's profile such as title, team, project, seniority, direct reports, etc. Furthermore, the scheduling/conferencing system 320 may access the chat environment to access data associated with the scheduled meeting as well as access the email server to access email exchanges, etc. It is appreciated that the scheduling/conferencing system 320 may further access any attachment or document related to the meeting, e.g., GDSII files for product launch. The scheduling/conferencing system 320 may apply AI and ML to the data in order to determine whether a premeeting meeting should be scheduled.

In some embodiments, the scheduling/conferencing system 320 provides its recommendation whether a premeeting meeting is needed to the host/organizer at the time that the meeting is being scheduled and in response to the host/organizer accepting the recommendation automatically sets up the premeeting meeting for a subset of the invitees. It is, however, appreciated that in some nonlimiting examples the scheduling/conferencing system 320 automatically sets up a premeeting meeting without any intervention by the host/organizer. It is further appreciated that the premeeting meeting is often scheduled right before the actual meeting, e.g., the premeeting meeting may be scheduled at 1:20 pm to 1:30 pm if the actual meeting is at 1:30 pm. However, it is appreciated that even though the illustrated examples describe the premeeting meeting being scheduled right before the actual meeting, the embodiments should not be construed as limited thereto. For example, a premeeting meeting may be scheduled at a time prior to the actual meeting with a gap in time between the two meetings, e.g., the premeeting meeting may be scheduled at 12 pm to 1 pm whereas the actual meeting is scheduled at 1:30 pm. It is further appreciated that the premeeting meeting may be scheduled on a different date than the actual meeting.

It is further appreciated that the scheduling/conferencing system 320 identifies a subset of the invitees to attend the premeeting meeting whereas the remainder of the invitees are prevented from attending the premeeting meeting. It is appreciated that, in some embodiments, the premeeting meeting and the actual meeting are two separate meetings with different IDs and are setup as two different meetings. Accordingly, the invitees of the actual meeting that are not invited to the premeeting meeting cannot join the premeeting meeting because the premeeting meeting and the actual meeting are setup as two separate meetings with different IDs. It is also appreciated that it may be determined that more than one premeeting meeting may be needed and as such more than one premeeting meeting is automatically setup. For example, it may be determined that one premeeting meeting is appropriate for a first group of invitees whereas a second premeeting meeting is appropriated for a second group of invitees (it is appreciated that there may be an overlap between the two groups of invitees) and where a third group of invitees are not invited to either of the premeeting meetings. It is appreciated that identifying invitees to attend a premeeting meeting may be based on application of AI and ML to the data, as described above. In other embodiments, identifying the invitees to attend a premeeting meeting may be based on heuristics.

Referring back to FIG. 7, the organizer/host has setup a meeting at time $t_0$. The host/organizer has identified invitees associated with invitee devices 703-707 to attend the meeting at time $t_0$. The scheduling/conferencing system 320 may determine that it is desirable to setup a premeeting meeting for a subset of the invitees. For example, in this illustrative example the scheduling/conferencing system 320 determines that a premeeting meeting for the invitees associated with invitee devices 703, 704, and the host device 701 is desirable. As such, the scheduling/conferencing system 320 automatically sets up a premeeting meeting invite for invitees associated with the invitee devices 703 and 704 and the host device 701. It is appreciated that the premeeting meeting is scheduled automatically in this example but it can be scheduled in response to the host/organizer selection to have a premeeting meeting, e.g., a GUI icon may be selected to indicate that a premeeting meeting may be desired when the meeting invite is being created by the host/organizer.

It is appreciated that in some embodiments, the premeeting meeting is scheduled at a predetermined amount of time prior to the actual meeting. For example, the premeeting meeting may be scheduled 30 minutes prior to the actual meeting and it may last 20 minutes to leave a 10 minute gap therebetween or it may last 30 minutes to lead directly into the actual meeting. In this illustrative example, the premeeting meeting is scheduled at $t_{-2}$ time prior to the actual meeting time $t_0$. The host device 701 and the invitee devices 703 and 704 connect 711 to the scheduling/conferencing system 320 at time $t_{-2}$ for their premeeting meeting. It is appreciated that the devices may connect in any fashion, as described above in FIGS. 2A-6. It is appreciated that the premeeting meeting at time t-2 starts for the host device 701, and the invitee devices 703 and 704.

According to some embodiments, the premeeting meeting is merged into the actual meeting scheduled at time $t_0$ to form a single meeting. It is appreciated the premeeting meeting may be scheduled as a separate meeting and merged into the actual meeting to form a single meeting, whereas in other embodiments, the premeeting meeting may be the start of the actual meeting, but the conferencing system 320 prevents other invitees (i.e. invitees not invited to the premeeting meeting) from joining until the actual time for the meeting. In some embodiments, the actual meeting is a continuation of the premeeting meeting.

According to some embodiments, the scheduling/conferencing system 320 sends a signal 712 at time $t_{-1}$ to the invitees of the premeeting meeting requesting them to take an action such that invitees of the actual meeting that are not invited to the premeeting meeting can join the meeting at or approximately at the time of the actual meeting. The scheduling/conferencing system 320 merges the premeeting meeting and the actual meeting in response to one of the invitees of the premeeting meeting or the host/organizer indicating that the premeeting meeting is over. It is appreciated that in some embodiments the signal 712 may be informational only without requiring the host device 701 or the invitee device 703 or 704 to take any action. For example, the signal 712 may merely indicate that invitee devices 702, 705, 706, and 707 are waiting and are about to join the meeting at time $t_0$ automatically.

In some nonlimiting examples, the invitee devices 702, 705, 706, and 707 are connected 713 to the meeting at time $t_0$. In other words, the premeeting meeting and the actual meeting are formed into a single meeting. According to some embodiments, the premeeting meeting may be a separate meeting from the actual meeting and at time $t_0$ they may be merged to form a single meeting.

Figure 8:
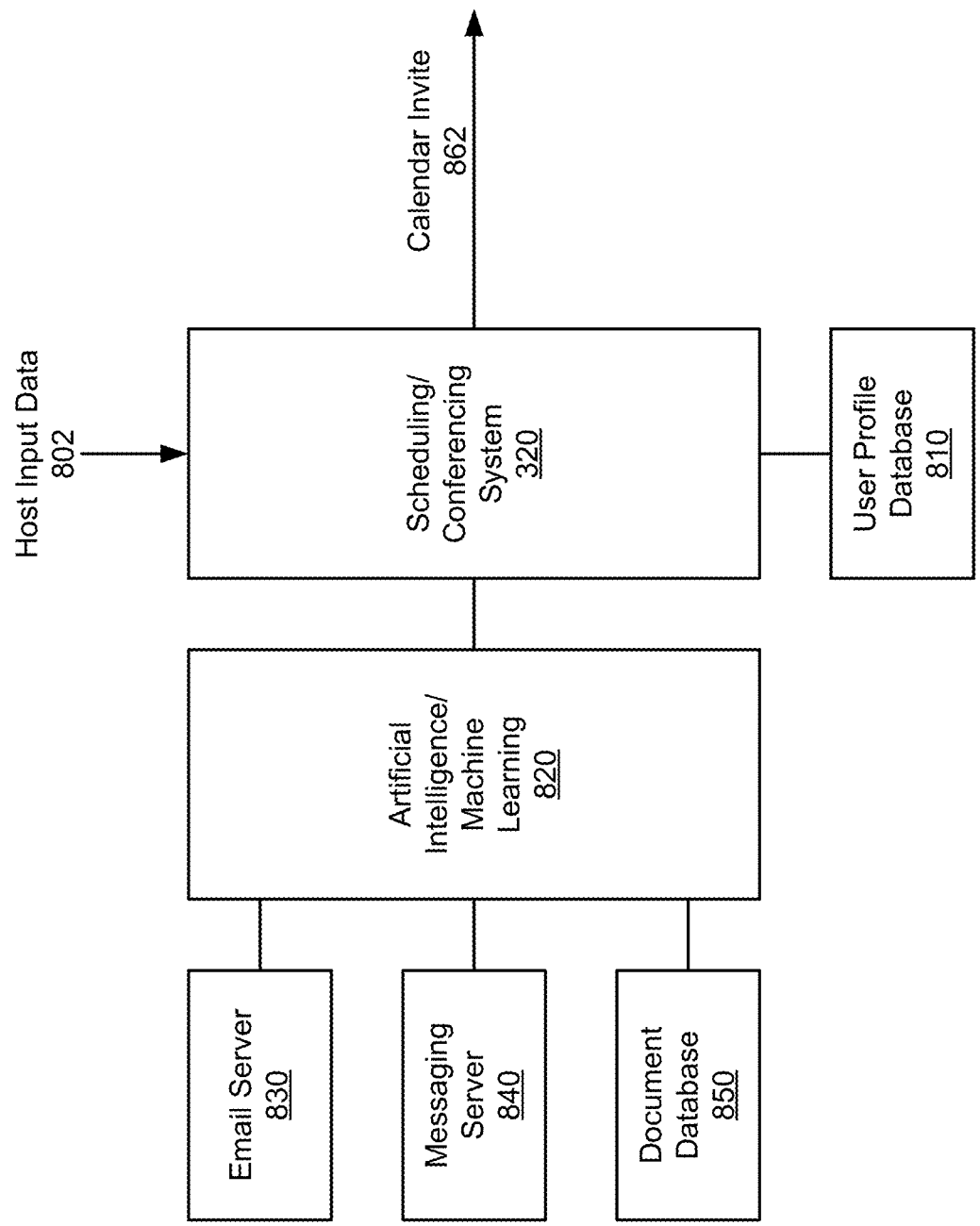
FIG. 8 is a system for determining whether a premeeting meeting is needed according to some embodiments.

Referring now to FIG. 8, a system for determining whether a premeeting meeting is needed according to some embodiments is shown. The system includes the scheduling/conferencing system 320, as described above, connected to an AI/ML unit 820. The AI/ML unit 820 applies artificial intelligence and machine learning to various data such as data from the email server 830, messaging server 840, and/or document database 850, e.g., product server, GDSII server, HR database, etc., to determine whether a premeeting meeting is needed. Moreover, applying artificial intelligence and machine learning to the received information can be used to identify a subset of the invitees that should be invited for the premeeting meeting and which invitees should be prevented from attending the premeeting meeting.

In some embodiments, the scheduling/conferencing system 320 receives a host input data 802, e.g., meeting invite, calendar invite, identification of which invitees should be invited to a premeeting meeting, etc. In some embodiments, the host input data 802 may be used in addition to other data to determine whether a premeeting meeting is needed and to identify a subset of the invitees that should be invited to the premeeting meeting. It is appreciated that the calendar invite 862 is transmitted from the scheduling/conferencing system 320 to the invitees. In some embodiments, the calendar invite 862 indicates to the subset of the invitees that they are invited to attend a premeeting meeting whereas other invitees are only invited to the actual meeting. As such, the calendar invite 862 may be different from one invitee to the next depending on whether they are invited to the premeeting meeting or only to the actual meeting.

In some embodiments, a user profile database 810 may be used to track various information regarding users, e.g., invitees. In this illustrative example, the user profile database 810 includes a calendar for each user to show various meetings scheduled for each day (i.e. back to back meetings, overlapping meetings, etc.), attendance profile for each user to show the number of meetings attended, habitual profile for each user to show punctuality of the user, title of the user to show their hierarchy within the organization, members reporting to the user and individual(s) the user reports to, etc. The information from the user profile database 810 provides intelligence and insight into why some invitees are habitually tardy, punctual, or late because of other obligations (back-to-back meetings, overlapping meetings, etc.). In other words, the user profile database 810 may be used to estimate how late each user/invitee to the current scheduled meeting is expected to be based on their past meeting attendance track record, based on their current calendar schedule, based on the location of the prior meeting in comparison to the current scheduled meeting (e.g., physical location as opposed to online meeting), based on the title of the current scheduled meeting and importance thereof as opposed to immediately preceding meeting, based on the attendees (e.g., title of the attendees) of the current scheduled meeting in comparison to the immediately preceding meeting, etc. According to some nonlimiting examples, AI/ML, algorithms are leveraged in order to estimate how late each user/invitee is expected to be. It is appreciated that the estimation of how late each invitee may be is more accurate than simply a past average because it considers the invitee's current calendar (e.g., overlapping meetings, back to back meeting, gaps/breaks within meetings, location of each meeting (e.g., online versus physical and location of the physical meetings), etc.), importance of other meeting on the invitee's calendar, attendees of the scheduled meeting and their respective titles as opposed to those attendees of other meeting on the invitee's calendar, the title of the scheduled meeting as opposed to other meetings on the invitee's calendar, etc. and further by leveraging AI/ML algorithms for determining the estimation. It is appreciated that the importance of meetings whether current meeting or prior meetings (e.g., immediately preceding meeting) may be a relative importance that compares the importance of two meetings. For example, while a meeting with a CEO of a company appear to be important but a subpoena to testify on behalf of the company may be more important. As such, the context of each meeting is used along with other information such as title of the participants of the meeting to determine the importance of the meeting.

The intelligence and insight can be used to further improve the scheduling/conferencing system 320 to improve efficiency, for instance. For example, certain invitees may be identified as being habitually late without having back-to-back or overlapping meetings. The meeting invite for those invitees may be scheduled slightly earlier in comparison to other invitees whereas the meeting invites for invitees that are late because they often have back-to-back or overlapping meetings is scheduled at its actual time. In some examples, multiple meeting reminders may be sent to certain invitees at regular intervals based on whether they are identified as being habitually late to prior meetings, or based on whether the current meeting is with someone they report to in the hierarchy of the organization. In some examples, the title of the invitees is used to modify the time for the scheduled meeting. For example, when the executive staff is meeting with the CEO of an organization the meeting may be scheduled slightly earlier for the executive staff in comparison to the CEO. Accordingly, it is appreciated that the same meeting may be scheduled for different invitees at slightly different time based on their profile, e.g., tardiness profile, title, etc.

It is appreciated that in some embodiments, the estimation of how late each invitee/user is expected to be may be rendered in the meeting card, e.g., calendar invite. For example, when the calendar invite is sent each invitee may be associated with their respective tardiness to reflect how late or prompt the invitee has been in the past. In some nonlimiting examples, the rendered estimate time is more than simply averaging the past record by taking into account the invitee's current calendar (e.g., overlapping meetings, back-to-back meeting, gaps/breaks within meetings, location of each meeting (e.g., online versus physical and location of the physical meetings), etc.), importance of other meeting on the invitee's calendar, attendees of the scheduled meeting and their respective titles as opposed to other meeting on the invitee's calendar, the title of the scheduled meeting as opposed to other meetings on the invitee's calendar, etc. Accordingly, the expectation regarding when each invitee may join the scheduled meeting can be managed accordingly and intelligently in a way that truly reflects each invitee's tardiness profile as well as their current calendar and relative importance of other meeting on the invitee's calendar. It is appreciated that the estimation of when each invitee may join the meeting may be modified dynamically as their calendar changes. For example, for illustrative purposes the estimate that a user will be 5 minutes late may change to an estimate that the user will be prompt if a prior meeting for that user has been canceled. In other words, the estimate of when each invitee will be joining the meeting can change over time as each invitee's calendar changes, e.g., more meetings are added, removed, time extended, the attendees of meetings may be changed, the venue of the meeting may be changed, etc.

In some nonlimiting examples, the invitees/users may be provided with preselected options to indicate how late that invitee may be to a meeting. For example, an invitee running late to the meeting may select the "Running 5 minutes late" option among a plurality of preselected options (e.g., "Running 10 minutes late", "Running 15 minutes late", "Can't make it", etc.) to notify other invitees. In some nonlimiting examples, the notification may be rendered as a popup message to the invitees of the meeting, it may be displayed in a chat, it may be reflected in the calendar, etc.

Figure 9A:
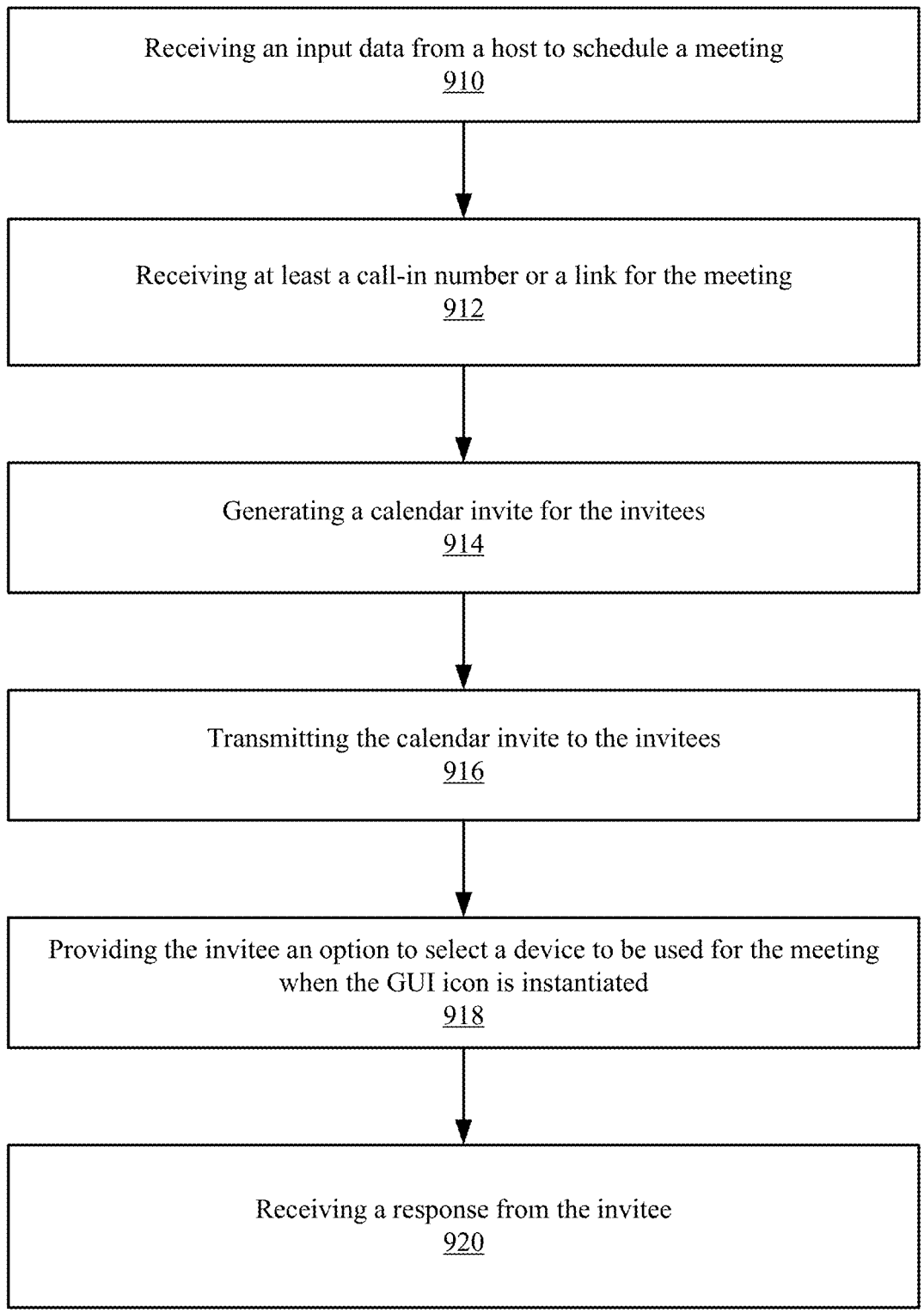
FIG. 9A is a flow chart illustrating an example of method flow for automatically joining a meeting in accordance with some embodiments.

Referring now to FIG. 9A, a flow chart illustrating an example of method flow for automatically joining a meeting in accordance with some embodiments is shown. At step 910, an input data is received from a host to schedule a meeting (as described above with respect to FIGS. 1-8). The input data may include invitees to the meeting, a title associated with the meeting, and a time/date associated with the meeting. At step 912, at least a call-in number or a link for the meeting is received, as described in FIGS. 1-8. At step 914, a calendar invite is generated for the invitees, as described in FIGS. 1-8. The calendar invite includes the at least the call-in number or the link for the meeting, the time/date associated with the meeting, the title associated with the meeting, and a user selectable GUI icon that once instantiated by an invitee of the invitees at a time of responding to the calendar invite automatically schedules the meeting for the invitee of the invitees to be launched at a predetermined threshold of time from the time/date associated with the meeting. At step 916, the calendar invite is transmitted to the invitees. It is appreciated that in some embodiments, the meeting is launched at the predetermined threshold of time from the time/date associated with the meeting and launching the meeting includes calling a device associated with the invitee. In one nonlimiting example, launching the meeting at the predetermined threshold of time from the time/date associated with the meeting includes a device of the invitee automatically calling the call-in number. In yet another nonlimiting example, launching the meeting at the predetermined threshold of time from the time/date associated with the meeting includes a device of the invitee automatically instantiate the link.

In some embodiments, a plurality of GUI icons may be provided to the invitees to capture a response from each invitee of the invitees whether the calendar invite is accepted, rejected, or accepted as tentative. In some embodiments, at step 918, the invitee is provided with an option to select a device to be used for the meeting when the GUI icon is instantiated. It is appreciated that the predetermined threshold of time from the time/date associated with the meeting may be approximately zero seconds from the time/date associated with the meeting. In some embodiments, at step 920, a response is received from the invitee. The response may indicate whether the invitee will be attending the meeting and whether the GUI icon has been instantiated to automatically launch the meeting at the predetermined threshold of time from the time/date associated with the meeting (as described in FIGS. 1-8).

Figure 9B:
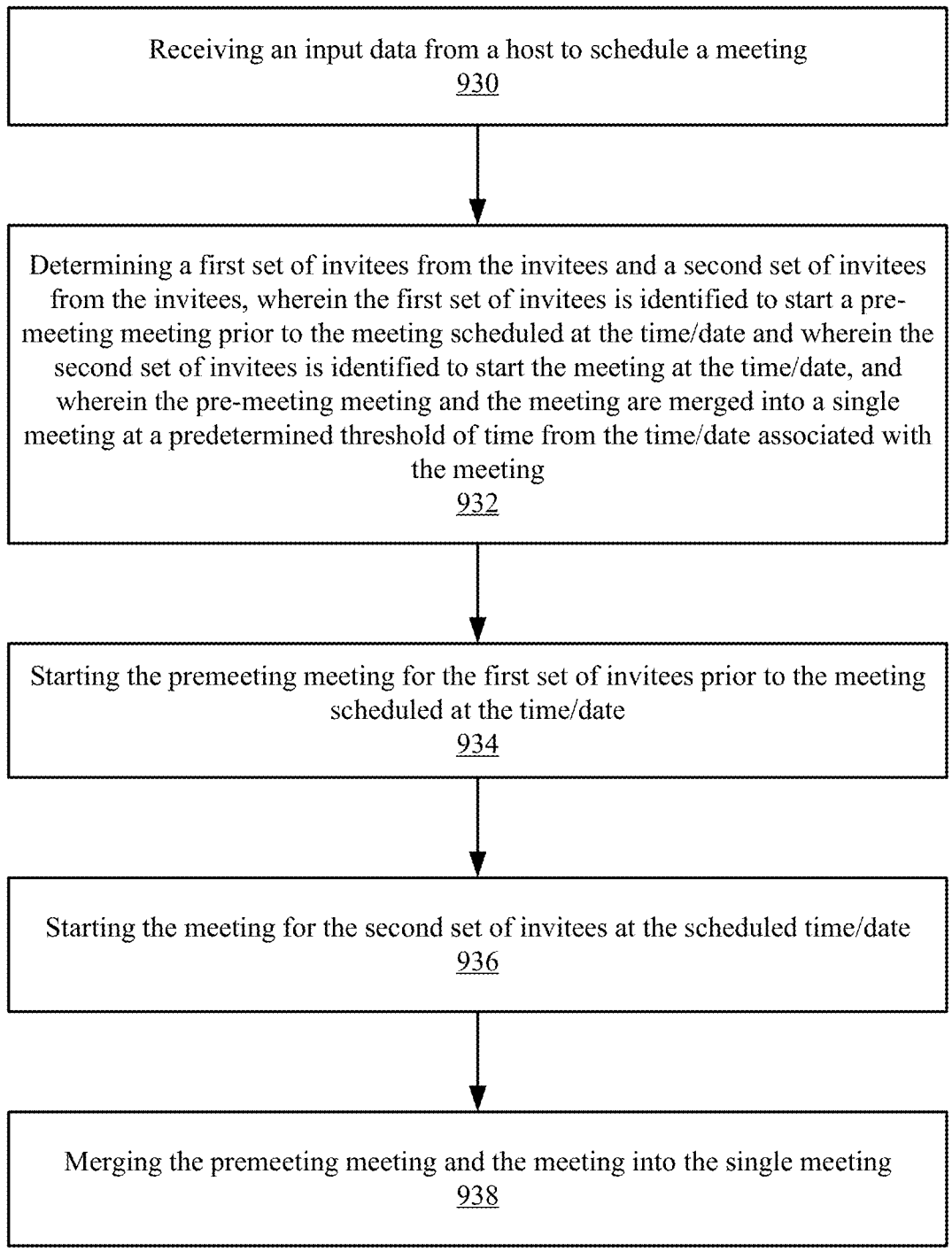
FIG. 9B is a flow chart illustrating an example of method flow for determining whether a premeeting meeting is needed in accordance with some embodiments.

Referring now to FIG. 9B, a flow chart illustrating an example of method flow for determining whether a premeeting meeting is needed in accordance with some embodiments is shown. At step 930, an input data from a host to schedule a meeting is received. It is appreciated that the input data may include invitees to the meeting and a time/date associated with the meeting, as described above. At step 932, a first set of invitees from the invitees is determined and a second set of invitees from the invitees is determined as described above with respect to FIGS. 7 and 8. The first set of invitees is identified to start a pre-meeting meeting prior to the meeting scheduled at the time/date. The second set of invitees is identified to start the meeting at the time/date. It is appreciated that the pre-meeting meeting and the meeting are merged into a single meeting at a predetermined threshold of time, e.g., 0 seconds, 10 seconds prior to the actual meeting time, 20 seconds after the actual meeting time, etc., from the time/date associated with the meeting. It is appreciated that determining whether a premeeting meeting is needed and the subset of the invitees to be invited to the premeeting meeting may be based on data collected from a chat room repository, a title of the meeting, and email exchanges associated with the meeting. It is appreciated that determining whether a premeeting meeting is needed and the subset of the invitees to be invited to the premeeting meeting may be determined by applying AI and ML to the data collected from the chat room repository, the title of the meeting, and the email exchanges associated with the meeting. According to some embodiments, the single meeting is continuation of the pre-meeting meeting after the second set of invitees join at the predetermined threshold of time from the time/date associated with the meeting. In some nonlimiting examples the pre-meeting meeting and the meeting are separate meetings and once merged form the single meeting. According to some embodiments, the pre-meeting meeting and the meeting are merged into the single meeting automatically at the predetermined threshold of time from the time/date associated with the meeting. In contrast, in some embodiments the pre-meeting meeting and the meeting are merged into the single meeting in response to an action by an invitee within the first set of invitees or an action by the host. It is appreciated that the action may be taken during the premeeting meeting. In some embodiments, at step 934, the premeeting meeting starts for the first set of invitees prior to the meeting scheduled at the time/date. At step 936, the meeting for the second set of invitees starts at the scheduled time/date. At step 938, the premeeting meeting and the meeting are merged into the single meeting.

Figure 9C:
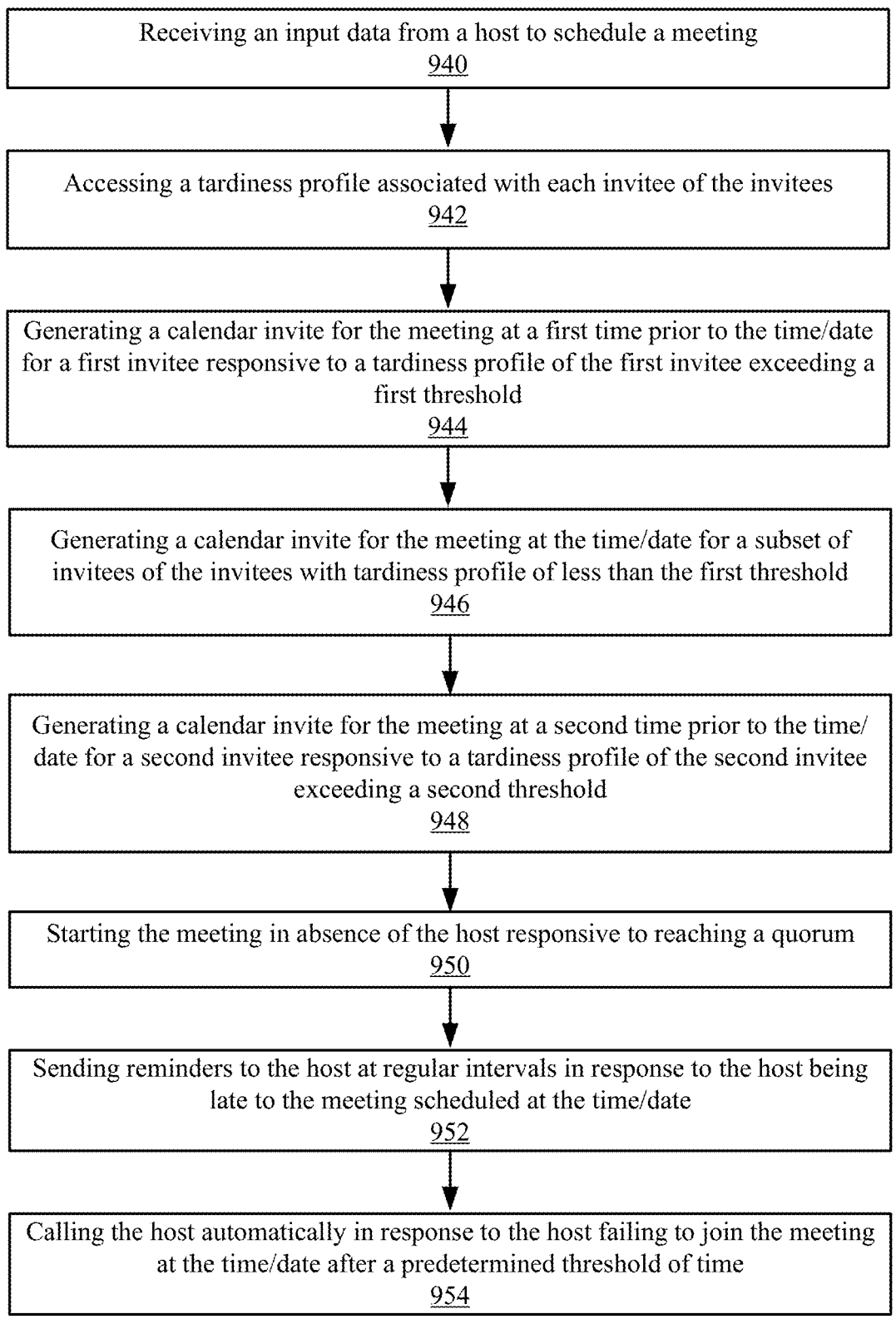
FIG. 9C is a flow chart illustrating an example of method flow for scheduling a meeting based on invitees profile and further starting the meeting in accordance with some embodiments.

Referring now to FIG. 9C, a flow chart illustrating an example of method flow for scheduling a meeting based on invitees profile and further starting the meeting in accordance with some embodiments is shown. At step 940, an input data is received from a host to schedule a meeting, as described above. It is appreciated that the input data may include invitees to the meeting, a title associated with the meeting, and a time/date associated with the meeting. At step 942, a tardiness profile associated with each invitee of the invitees may be accessed. At step 944, a calendar invite is generated for the meeting at a first time prior to the time/date for a first invitee responsive to a tardiness profile of the first invitee exceeding a first threshold, as described above in FIG. 8. At step 946, a calendar invite is generated for the meeting at the time/date for a subset of invitees of the invitees with tardiness profile of less than the first threshold, as described above. At step 948, a calendar invite is generated for the meeting at a second time prior to the time/date for a second invitee responsive to a tardiness profile of the second invitee exceeding a second threshold. It is appreciated that at step 950, the meeting may start in absence of the host, responsive to reaching a quorum. In some embodiments, at step 952, reminders are sent to the host at regular intervals in response to the host being late to the meeting scheduled at the time/date. At step 954, the host may automatically receive a call from the scheduling/conferencing system in response to the host failing to join the meeting at the time/date after a predetermined threshold of time.

Figure 10:
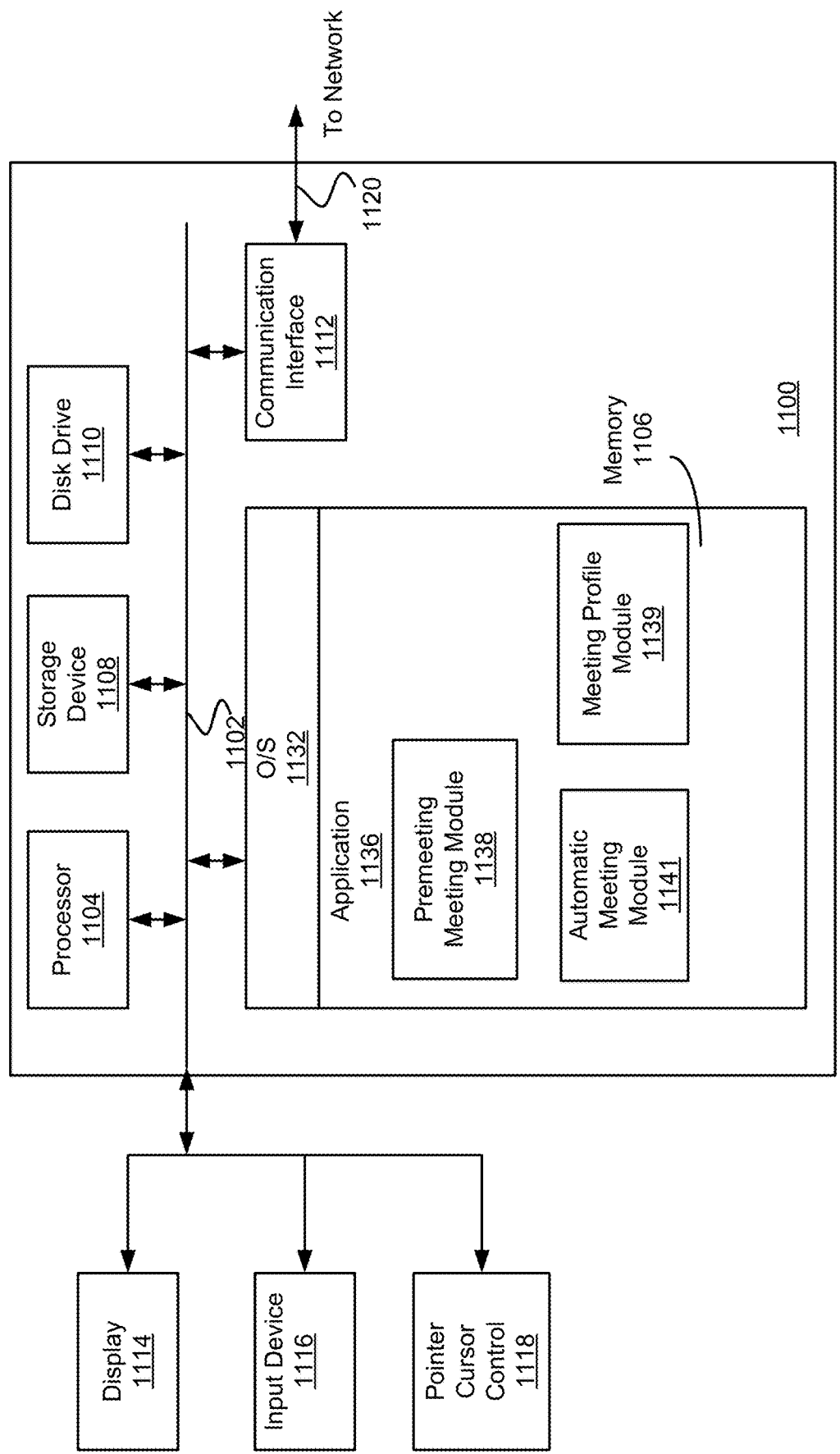
FIG. 10 is a block diagram depicting an example of computer system suitable for creating online chats in accordance with some embodiments.

Referring now to FIG. 10, an exemplary block diagram of a computer system suitable for automatic launching of meeting, creating/scheduling a premeeting meeting, and generating meeting invites based on invitee's profile, e.g., tardiness profile, in accordance with some embodiments is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes a module of executable instructions for premeeting meeting module 1138 that determines whether a premeeting meeting is needed and identifies invitees to attend the premeeting, as well as modules of executable instructions for automatic launching meeting module 1141 to automatically launch the meeting at the time of the meeting in response to the invitee's selection to do so at the time of responding to the meeting invite and a meeting profile module 1139 that creates the meeting invite at slightly different times for different invitees based on the invitees profile, e.g., title and organization chart, tardiness profile, etc.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device. Various embodiments can apply to any electronic screen sharing.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method, comprising:
receiving an input data from a host to schedule a meeting, wherein the input data includes invitees to the meeting and a time or date associated with the meeting; and
determining a first set of invitees from the invitees and a second set of invitees from the invitees, wherein the first set of invitees is identified to start a pre-meeting meeting prior to the meeting scheduled at the time or date and wherein the second set of invitees is identified to start the meeting at the time or date, and wherein the pre-meeting meeting and the meeting are merged into a single meeting at a predetermined threshold of time from the time or date associated with the meeting.

2. The method as described in claim 1, wherein the determining is based on data collected from a chat room repository, a title of the meeting, and electronic mail (email) exchanges associated with the meeting.

3. The method as described in claim 1, wherein the determining is based on application of artificial intelligence (AI) and machine learning (ML) to a data collected from a chat room repository, a title of the meeting, and an electronic mail (email) exchanges associated with the meeting.

4. The method as described in claim 1, wherein the single meeting is continuation of the pre-meeting meeting after the second set of invitees join at the predetermined threshold of time from the time or date associated with the meeting.

5. The method as described in claim 1, wherein the pre-meeting meeting and the meeting are separate meetings and once merged form the single meeting.

6. The method as described in claim 1, wherein the pre-meeting meeting and the meeting are merged into the single meeting automatically at the predetermined threshold of time from the time or date associated with the meeting.

7. The method as described in claim 1, wherein the pre-meeting meeting and the meeting are merged into the single meeting in response to an action by an invitee within the first set of invitees or the host, wherein the action is taken during the premeeting meeting.

8. The method as described in claim 1, further comprising:
starting the premeeting meeting for the first set of invitees prior to the meeting scheduled at the time or date; and
starting the meeting for the second set of invitees at the scheduled time or date.

9. The method as described in claim 8, further comprising merging the premeeting meeting and the meeting into the single meeting.

10. The method as described in claim 1 further comprising estimating whether an invitee is expected to be late to the meeting based on past behavior for the invitee and further based on a current calendar of the invitee.

11. A method, comprising:
receiving an input data from a host to schedule a meeting, wherein the input data includes invitees to the meeting, a title associated with the meeting, and a time or date associated with the meeting;
accessing a tardiness profile associated with each invitee;
generating a calendar invite for the meeting at a first time prior to the time or date for a first invitee responsive to a tardiness profile of the first invitee exceeding a first threshold; and generating a calendar invite for the meeting at the time or date for a subset of invitees with tardiness profile of less than the first threshold.

12. The method as described in claim 11, further comprising:
generating a calendar invite for the meeting at a second time prior to the time or date for a second invitee responsive to a tardiness profile of the second invitee exceeding a second threshold.

13. The method as described in claim 11, further comprising:
starting the meeting in absence of the host responsive to reaching a quorum.

14. The method as described in claim 11, further comprising:
sending reminders to the host at regular intervals in response to the host being late to the meeting scheduled at the time or date.

15. The method as described in claim 11, further comprising calling the host automatically in response to the host failing to join the meeting at the time or date after a predetermined threshold of time.

16. The method as described in claim 11 further comprising estimating whether an invitee is expected to be late to the meeting based on past behavior for the invitee and further based on a current calendar of the invitee.

* * * * *